United States Patent
Shankel et al.

(10) Patent No.: US 12,165,161 B2
(45) Date of Patent: Dec. 10, 2024

(54) EVALUATING ONLINE ACTIVITY TO IDENTIFY TRANSITIONS ALONG A PURCHASE CYCLE

(71) Applicant: Microsoft Technology Licensing, LLC, Redmond, WA (US)

(72) Inventors: Peter Willard Shankel, Sachse, TX (US); Matthew Robert Teshera, Weehawken, NJ (US); Bo Hong, Coppell, TX (US); Shanshan Wang, Mckinney, TX (US); Varadha Sundaram, Richardson, TX (US); Matthew White, Prosper, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 17/166,348

(22) Filed: Feb. 3, 2021

(65) Prior Publication Data
US 2022/0245654 A1 Aug. 4, 2022

(51) Int. Cl.
G06Q 30/0201 (2023.01)
G06F 16/955 (2019.01)

(52) U.S. Cl.
CPC ..... G06Q 30/0201 (2013.01); G06F 16/9566 (2019.01)

(58) Field of Classification Search
None
See application file for complete search history.

(56) References Cited

U.S. PATENT DOCUMENTS

| | | | |
|---|---|---|---|
| 9,092,801 B2 | 7/2015 | Chang et al. | |
| 9,767,182 B1 | 9/2017 | Thakur et al. | |
| 10,469,664 B2 | 11/2019 | Pirat et al. | |
| 10,726,427 B2 | 7/2020 | Kannan et al. | |
| 11,953,866 B2 * | 4/2024 | Abe | G05B 19/054 |

(Continued)

FOREIGN PATENT DOCUMENTS

| | | | | |
|---|---|---|---|---|
| GB | 2506575 A | * | 4/2014 | G06F 17/30867 |
| WO | WO-2022162343 A1 | * | 8/2022 | G16B 15/30 |

OTHER PUBLICATIONS

Hendriksen et al., Analyzing and Predicting Purchase Intent in E-commerce: Anonymous vs. Identified Customers (Year: 2020).*

(Continued)

*Primary Examiner* — Mohamed N El-Bathy

(57) ABSTRACT

Aspects of the subject disclosure may include, for example, obtaining a session record including properties visited by a consumer during a sample period and extracting, from the session record, a select group of properties associated with a particular category of a predetermined taxonomy of various marketplaces. A breadth value of the select group of properties visited during the sample period is determined according to a number of unique properties of the select group of properties. A depth value of the properties visited during the sample period is also determined according to an extent of consumer interaction with content of properties of the select group of properties. A change point, indicating a state transition along a purchase cycle, is determined based on variations in distributions more than one of the breadth, depth, and recency values without relying on an assumption of a specific parametric family. Other embodiments are disclosed.

20 Claims, 12 Drawing Sheets

(56) References Cited

U.S. PATENT DOCUMENTS

| | | | |
|---|---|---|---|
| 2009/0106085 A1* | 4/2009 | Raimbeault | G06Q 50/01 705/14.23 |
| 2011/0071900 A1 | 3/2011 | Pani et al. | |
| 2011/0082824 A1* | 4/2011 | Allison | G06Q 10/10 706/46 |
| 2013/0080362 A1 | 3/2013 | Chang et al. | |
| 2013/0282595 A1 | 10/2013 | Vijayaraghavan et al. | |
| 2014/0006293 A1 | 1/2014 | Chang et al. | |
| 2014/0040008 A1 | 2/2014 | Belani et al. | |
| 2015/0134401 A1* | 5/2015 | Heuer | G06Q 30/0202 705/7.29 |
| 2016/0086243 A1* | 3/2016 | Zimmerman | G06Q 30/0631 705/26.7 |
| 2016/0189246 A1 | 6/2016 | Eldh et al. | |
| 2019/0266619 A1* | 8/2019 | Namba | G06F 16/955 |
| 2020/0357026 A1* | 11/2020 | Liu | G06Q 30/0271 |
| 2020/0402111 A1* | 12/2020 | Heikkinen | G06Q 30/0269 |
| 2020/0408554 A1* | 12/2020 | Jaatinen | G06F 11/3438 |
| 2022/0005067 A1* | 1/2022 | Sussman | H04W 4/23 |
| 2022/0121718 A1* | 4/2022 | Barron | G06F 16/955 |

OTHER PUBLICATIONS

Wirani et al., Investigating the Influence of Information Quality, Information Seeking, and Familiarity with Purchase Intentions: A Perspective of Instagram Users in Indonesia (Year: 2020).*

Lin et al., Predicting Outcomes of Active Sessions Using Multi-action Motifs (Year: 2019).*

Wu et al., Prediction of the intention of purchase of the user surfing on the Web using hidden Markov model (Year: 2005).*

Sheni et al., Prediction Factory: automated development and collaborative evaluation of predictive models (Year: 2018).*

"10 ways Machine Learning is influencing the customer journey," MonkeyLearn/Blog, https:\\monkeylearn.com/blog/machine-learning-on-the-customer-journey/, Printed Dec. 17, 2020, 11 pages.

Bockisch, Christina, "How to Map the Buyer's Journey in 7 Easy Steps", https://clariantcreative.com/blog/how-to-map-the-buyers-journey-in-7-easy-steps, Dec. 14, 2018, 14 pages.

Hill, Jeannie, "How Search Intent is Reshaping Consumer Journey Mapping", https://www.hillwebcreations.com/search-intent-reshapes_customer-journey, Dec. 31, 2018, 41 pages.

Ma, Zhenfeng et al., "Consumer Adoption of New Products: Independent Versus Interdependent Self-Perspectives", American Marketing Association, vol. 78, 2014, Mar. 2014, 18 pages.

* cited by examiner

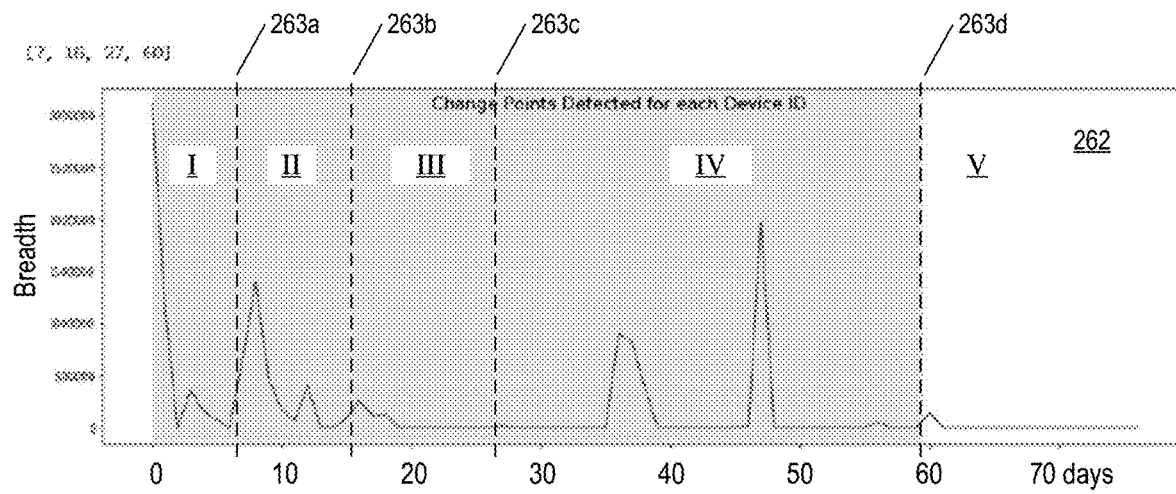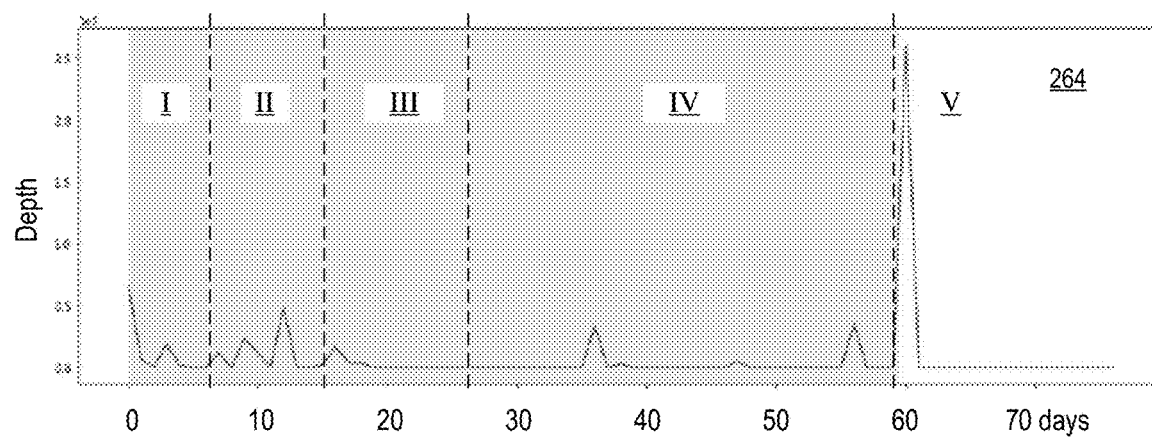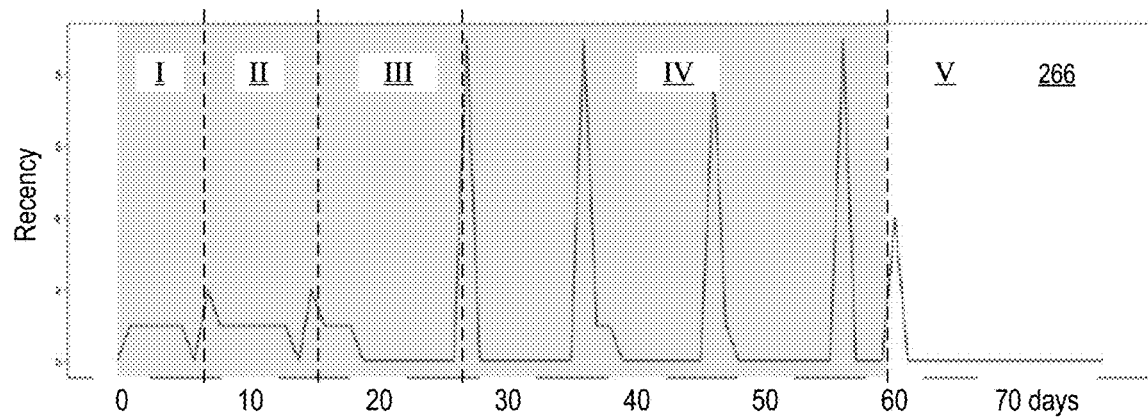
FIG. 2F

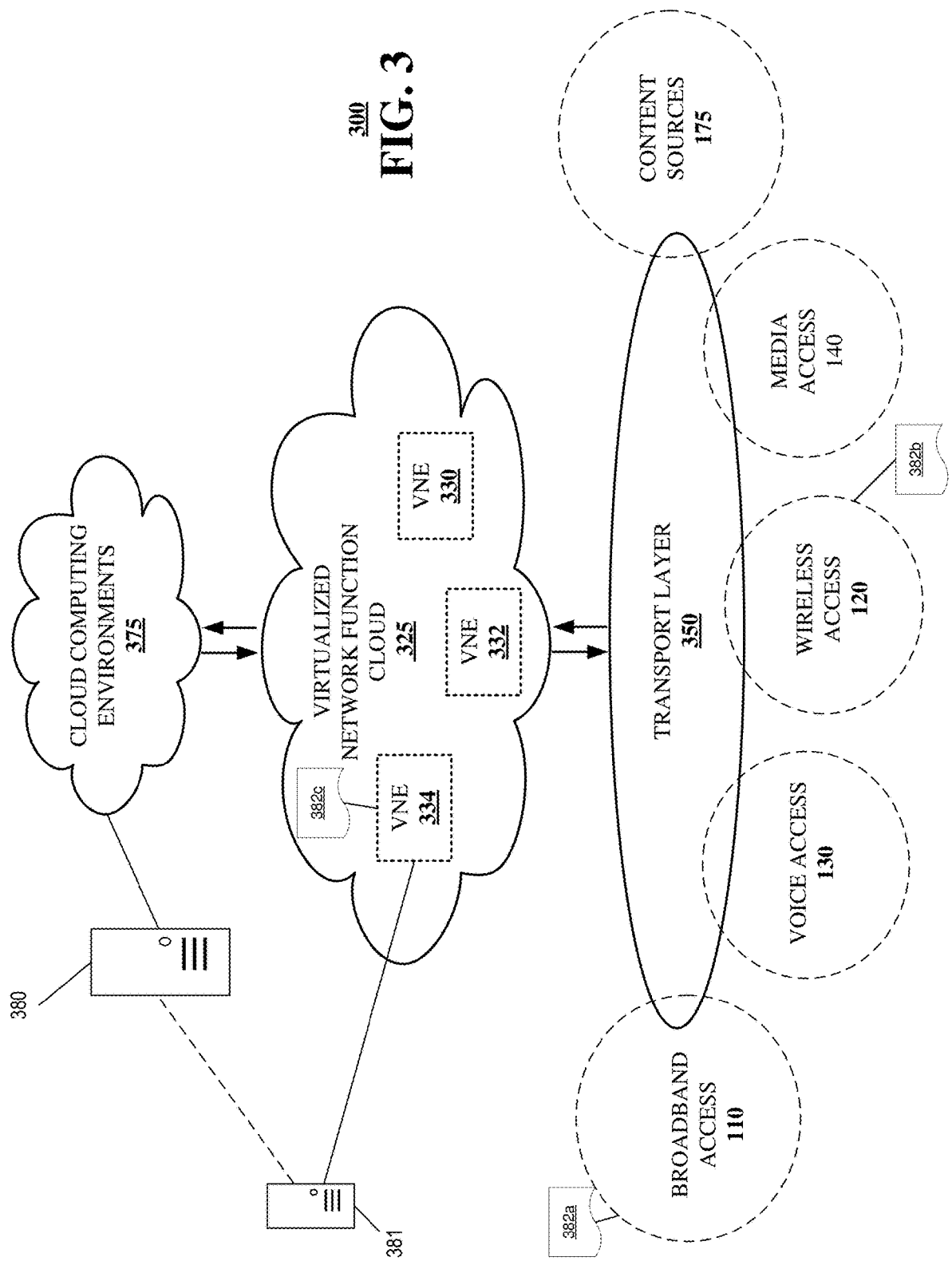

EVALUATING ONLINE ACTIVITY TO IDENTIFY TRANSITIONS ALONG A PURCHASE CYCLE

FIELD OF THE DISCLOSURE

The subject disclosure relates to evaluating online activity to identify transitions along a purchase cycle.

BACKGROUND

In an effort to determine real-time needs of consumers, it is beneficial to understand what products and/or services a consumer may be seeking at any given time, referred to generally as consumer intent. In at least some scenarios, intent may be inferred from the consumer's behavior. An understanding of consumer intent would provide merchandisers with insight, which may be used to influence consumer's behavior. For example, in a brick-and-mortar store, when a customer enters an aisle for men's dress shirts, it can be inferred that the consumer has expressed an intent, presumably based on an interest in men's shirts, which led then to that particular aisle.

In a digital advertising realm, intent may be inferred in a similar manner, e.g., should the consumer happen to visit a company's website. Consequently, by merely visiting a website, great resources may be brought to bear to "chase" that consumer with retargeting, typically for some preset period of time. For example, demographics and targeting providers may gauge intent based only in heuristics. Such educated guesses may constitute a locus of targeting lists that may be used in prospecting. Alternatively, conquest-based advertising may posit intent by assuming that, if a customer visits, for example, a cooking blog, that customer is probably in the market for cooking supplies. For other goods and services, intent may be invoked in a near simultaneous manner with the realization of a problem or, intent can emerge over many months after realizing a problem exists.

BRIEF DESCRIPTION OF THE DRAWINGS

Reference will now be made to the accompanying drawings, which are not necessarily drawn to scale, and wherein:

FIG. 2F is a graph illustrating another example, non-limiting embodiment of change point detection as may be determined by the communication network of FIG. 1 and the consumer monitor and evaluation system of FIG. 2A, in accordance with various aspects described herein.

FIG. 3 is a block diagram illustrating an example, non-limiting embodiment of a virtualized communication network in accordance with various aspects described herein.

DETAILED DESCRIPTION

Figure 1:
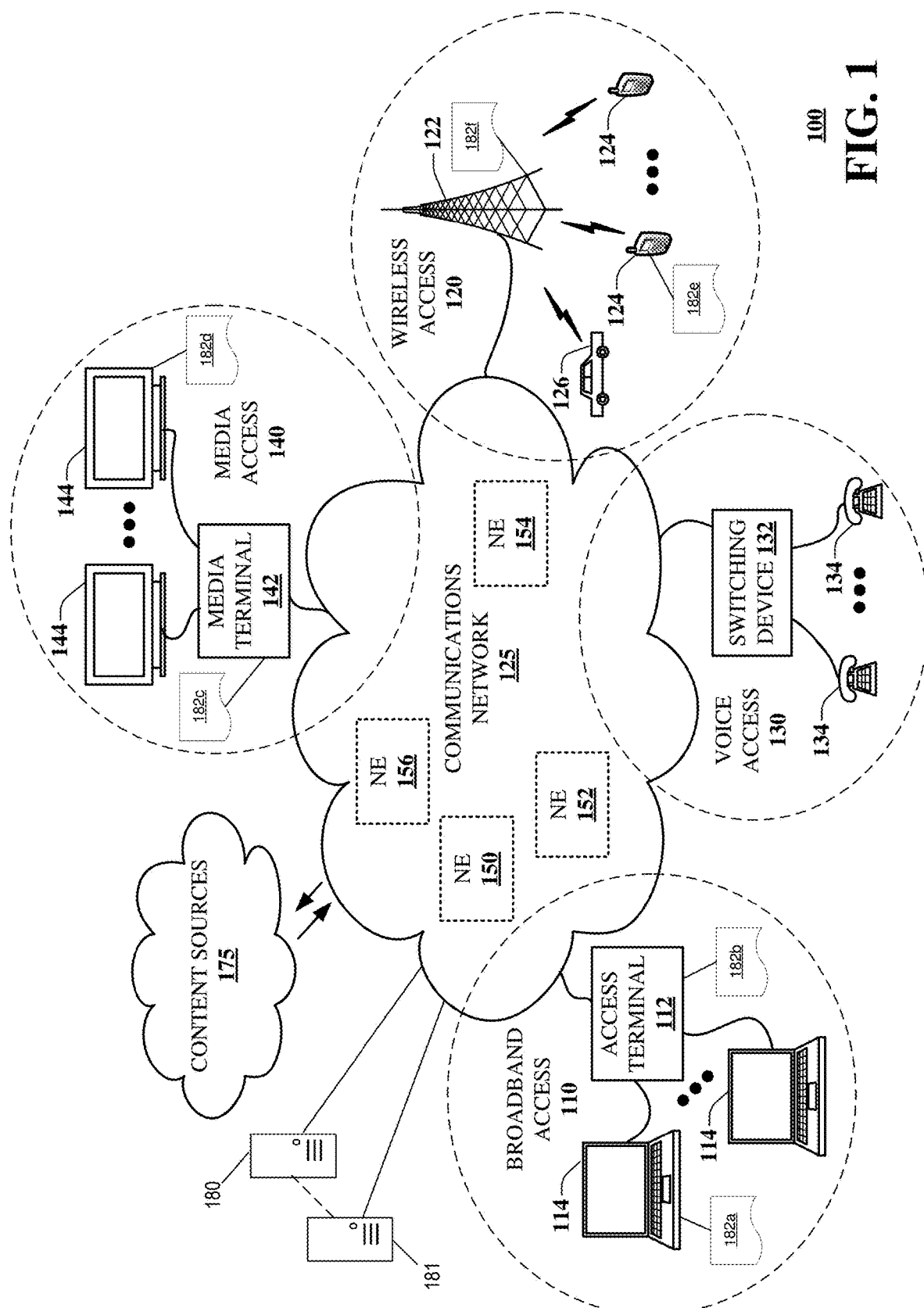
FIG. 1 is a block diagram illustrating an exemplary, non-limiting embodiment of a communications network adapted to monitor consumer activity and identify stages of a purchase cycle in accordance with various aspects described herein.

The subject disclosure describes, among other things, illustrative embodiments for identifying transitions along a purchase cycle, sometimes referred to as a buying cycle or a buyer's journey, according to properties visited by a consumer. Identification of a transition is based on a multivariate analysis of the consumer's activity, including online activities such as their web browsing history. The analysis includes determinations sequences of breadth, depth and/or recency values based, at least in part, on the consumer's online activity. The analysis further detects outliers within these values according to earlier values within the sequences. An outlier may signify a transition between different stages of the purchase cycle. Other embodiments are described in the subject disclosure.

One or more aspects of the subject disclosure include a process for characterizing consumer activity. The process includes receiving, by a processing system including a processor, a session record including a number of web addresses visited by a consumer during a sample period. According to the process, a categorization is determined of the number of web addresses according to a taxonomy of various marketplaces to obtain a categorized session record. A select group of web addresses of the number of web addresses associated with a particular category of the taxonomy of various marketplaces is extracted from the categorized session record. A breadth value is calculated for the select group of web addresses of the sample period, according to a number of unique web addresses of the select group of web addresses. Likewise, a depth value is calculated for the select group of web addresses of the sample period, according to an extent of consumer interaction with content of web addresses of the select group of web addresses. A change point is identified based on variations in a distribution of the breadth value and a distribution of the depth value without relying on an assumption of a specific parametric family. The change point indicates a state transition along a purchase cycle.

One or more aspects of the subject disclosure include a device for characterizing consumer activity. The device includes a processing system having a processor and a memory that stores executable instructions that, when executed by the processing system, facilitate performance of operations. The operations include obtaining a session record including a number of properties visited by a consumer during a sample period. A categorization of the number of properties is determined according to a taxonomy of various marketplaces to obtain a categorized session record. A select group of properties of the number of properties associated with a particular category of the taxonomy of various marketplaces is obtained from the categorized session record. A breadth value is calculated for the select group of properties of the sample period, according to a number of unique properties of the select group of properties. Likewise, a depth value is calculated for the select group of properties of the sample period, according to an extent of consumer interaction with content of properties of the select group of properties. A change point is identified based on variations in a distribution of the breadth value and a distribution of the depth value without relying on an assumption of a specific parametric family. The change point indicates a state transition along a purchase cycle.

One or more aspects of the subject disclosure include a machine-readable storage medium, including executable instructions that, when executed by a processing system having a processor, facilitate performance of operations. The operations include obtaining a session record including a number of properties visited by a consumer during a sample period. According to the operations, a select group of properties of the number of properties associated with a particular category of a predetermined taxonomy of various marketplaces is extracted from the session record. A breadth value is determined for the select group of properties during the sample period, according to a number of unique properties of the select group of properties. A depth value is determined for the properties visited within the particular category, during the sample period, according to an extent of consumer interaction with content of properties of the select group of properties, and a change point is identified based on variations in a distribution of the breadth value and a distribution of the depth value without relying on an assumption of a specific parametric family. The change point indicates a state transition along a purchase cycle.

Referring now to FIG. 1, a block diagram is shown illustrating an example, non-limiting embodiment of a system 100 in accordance with various aspects described herein. The system 100 includes, among other things, equipment adapted to identify a transition along a purchase cycle of a potential consumer visiting properties within one or more marketplaces. Identification of a transition and/or a position along the purchase cycle within a particular marketplace is based on a multivariate analysis of the potential consumer's activity within that marketplace as may be obtained from online activities, such as their web browsing history. The analysis determines more than one aspects of consumer activity, such as more than one of breadth, depth, intensity, recency, and frequency values based, at least in part, on the consumer's activity. The analysis further detects an outlier based on a comparison of the determined values to historical records of previously determined values. An outlier may signify a transition from one stage to another of the purchase cycle. The illustrative examples disclosed herein refer, without limitation, to a potential consumer's activity, such as URL visitations.

For example, the system 100 may facilitate in whole or in part determining temporal sequences of breadth, depth, intensity, recency and/or values of marketplace activity of a consumer within a select group of properties, e.g., URLs visited during an observation period. A changepoint may be determined by identifying outliers of one or more of the breadth and depth, intensity, frequency values. Outliers may be determined by comparison of current values to earlier values within the temporal sequences. Alternatively or in addition, determining outliers may utilize an outlyingness function, such as a Mahalanobis distance function, as discussed more fully below. The breadth, depth, intensity, frequency and or recency values alone or in combination may provide insight as to what stage the consumer may be in along the purchase cycle. A change point, e.g., as determined by outliers, may suggest a state transition along the purchase cycle.

The example communications network 125 provides broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example system 100 also includes a marketplace activity monitor 180, a changepoint detector 181 and one or more user interfaces 182*a*, 182*b*, 182*c*, 182*d*, 182*d*, 182*f*, generally 182. By way of example, the marketplace activity monitor 180 may include a server adapted to monitor visits of one or more potential consumers to properties affiliated with one or more marketplaces. Monitoring may include monitoring of online activity, e.g., message traffic, between communications equipment of a potential consumer and equipment of marketplace suppliers or providers.

In at least some embodiments, the marketplace activity monitor 180 is adapted to report and/or otherwise prepare reports of marketplace activity for further analysis. In at least some embodiments, the marketplace activity monitor 180 may be adapted to monitor network-related activity of one or more subscribers of the communications network 125. Marketplace activity may include, without limitation, online activity, such as web-browsing activity, e.g., including identification of Uniform Resource Locators (URLs) visited, web content owners, marketplace affiliations and/or categorizations, source and/or destination network addresses, dates and/or times associated with the monitored activity, durations of time associated with each visited address and/or web resource, bytes of data transferred, e.g., bytes transferred down, i.e., "bytes down," from the network address to subscriber equipment and/or bytes transferred up, i.e., "bytes up," from the communication equipment of the potential consumer to the network address, whether commercial transactions occurred.

In at least some embodiments, the properties may include physical properties, in which instance a visitation may be identified according to a determination that the potential consumer, e.g., equipment associated with and/or otherwise in possession by the potential consumer at a location of the physical properties. A physical property may be identified according to a location of mobile equipment of the potential consumer. The mobile equipment may be equipped with a location determining feature, such as a GPS receiver, to determine or otherwise estimate geocoordinates of the mobile device. Alternatively or in addition, a location of the mobile equipment may be determined according to a location determined and/or otherwise estimated by a mobile service provider. Certain locations, such as retail outlets, e.g., automobile dealerships, may be associated with addresses and/or geocoordinates. The marketplace activity monitor 180 may generate and/or update a report in response to a location of mobile subscriber equipment corresponding to such a physical marketplace. Alternatively or in addition, locations may be reported by the consumer, e.g., via a social media application, such as checking in when visiting a physical property. In at least some instances, locations may be determined by owners and/or operators of the physical properties. For example, the potential consumer may visit a physical site, and make their presence known to the site owner/operator, who may, in turn, report the potential consumer's physical property visit to the marketing activity monitor.

The marketplace activity monitor 180 may generate records of monitored activity that may include, for example, one or more of a user identifier, a user equipment identifier, a time at which the activity occurred and/or was observed, one or more network addresses, URLs, and the like, bytes transferred, direction of bytes transferred and so on. It is understood that in at least some embodiments, the user identifiers may be adapted to guard and/or otherwise protect the user's true identity, e.g., using a tokenized identification reference scheme. Consider an association of anonymized tokens with user identifiers and/or user equipment identifiers that may be retained by an authorized or trusted entity, such as a network service provider, to permit, when authorized, an association of the anonymous token with the actual user and/or equipment identifiers.

Monitoring may be continuous, such that reporting of monitored activity and/or generating and/or updating of monitored activity reports occurs in real time and/or near real time with respect to the monitored activity. Alternatively or in addition, the monitoring may occur continuously, but be reported according to a schedule, e.g., according to a sample period, e.g., a number of months, weeks, days, hours, minutes and/or seconds. For example, potential consumer activity observed by the activity monitor 180 over a 24-hour period may be stored as a consumer activity sample.

Other monitoring periods may include 12-hour periods, e.g., a daytime sample and an evening sample. Still other monitoring periods may include, without limitation, a workday period, e.g., Monday-Friday, 9 am through 5 μm, and a monitored non-workday period. Distinguishing times of day and/or days of week may permit a more detailed evaluation of the potential consumer's activity, e.g., by performing the analyses separately for the different monitored periods. Consider having separate daytime and evening breadth, depth, intensity, frequency and or recency values to permit detection of transitions and/or mapping of the purchase cycle separately for each period. Alternatively or in addition, offsets may be applied between the different periods to account for differences in the consumer's activity during these periods. In at least some embodiments, a selection of the sample period may depend upon one or more of the particular marketplace under consideration and/or according to the particular customer or class of customers being observed.

In at least some embodiments, the monitored results may be stored and/or provided by the activity monitor 180 to the changepoint detector 181 according to the sample period, e.g., every 24 hours. Subsequent monitored samples may be obtained by the activity monitor 180 and/or shared with the changepoint detector 181 according to the sample period. Alternatively or in addition, the monitored samples may be obtained according to one sample period, e.g., every hour, and provided to the changepoint detector 181 according to a reporting period, e.g., every 24 hours.

In at least some embodiments, the activity monitor 180 is adapted to monitor activity of multiple consumers. For example, the activity monitor 180 may be located at one or more network locations, e.g., at one or more network nodes of the communication network 125. For mobility networks, the activity monitor 180 may be located and/or otherwise associated with equipment of a mobility core network. Accordingly, the activity monitor 180 may monitor the activity of all mobile subscriber traffic handled by the mobility core network. When activity of multiple potential consumers is monitored, the resulting monitor reports and/or records may be adapted to include the mobile subscriber identifier and/or user equipment identifier to permit reporting and/or analysis on a per subscriber and/or per user equipment basis. It is understood that in at least some embodiments, reports are generated for all subscriber traffic monitored. Alternatively or in addition, reports may be generated for a subset of all subscriber traffic. For example, monitoring may be accomplished according to a subscriber's subscription status, age, gender, or other demographic.

Online activity may be categorized to facilitate one or more of the monitoring, analysis, scoring. In a marketing and/or advertising context, the potential consumer activity may be categorized according to an associated marketplace. As consumer activity in some marketplaces may differ from others, it is conceivable that differences of a general nature may be observed in one or more of the breadth, depth, intensity, frequency and/or recency values. Differences may include differences in magnitudes and/or trends in the values. An understanding of the differences, as may be determined based on the techniques disclosed herein, may facilitate marketing and/or advertising campaigns. As any more general marketplace distinctions are observed, they may be used to focus one or more of future monitoring and/or analysis activities.

By way of example, visited properties, such as URLs and/or physical properties, may be categorized according to a marketplace taxonomy. One example of such categorization is content taxonomy standardized by the Interactive Advertising Bureau (IAB). Websites, e.g., according to their URLs, may be categorized beforehand according to the IAB categories. In at least some embodiments, the marketplace taxonomy is hierarchal. For example, categorization may be accomplished according to a first tier, e.g., tier I of the TAB categories. Examples of tier I categories include, without limitation: arts & entertainment; automotive; food and drink, home & garden, personal finance, and the like. One or more of the tier I categories may be further subcategorized according to a tier II categorization. Examples of tier II categories for the automotive tier I category may include, without limitation: auto parts; convertible; coupe, crossover, pickup; sedan, and so on. In at least some embodiments, the marketplace activity monitor 180 associates visited properties, e.g., URLs, with marketplace categories and/or subcategories, providing results of such categorizations in its reports.

Properties may include visited network resources, e.g., URLs. Without limitation, distinction as to different properties may be attributed to different URLs, each URL being considered a different property. Alternatively or in addition, the distinction as to different properties may be attributed to different entities, e.g., different brands. Consider a potential consumer visiting an automobile manufacturer's web site, and also visiting a regional website and/or distributor or dealer of the same manufacturer. There may be some advantage to knowing that the web content was related to a common product or service, e.g., the same brand. In some embodiments, each of the websites may be considered as independent properties at least in that they correspond to different URLs. Alternatively or in addition, all websites attributed to a common source, e.g., the same automobile manufacturer, may be considered as common properties of that particular manufacturer.

According to the illustrative example, the marketplace activity monitor 180 may be in communication with the changepoint detector 181 either directly (connectivity shown in phantom) and/or through the communications network 125. The changepoint detector 181, in turn, may receive monitored activity reports and/or analyze the reports to obtain one or more of the breadth, depth, intensity, frequency and/or recency values. The values may be used to facilitate detection of changes in marketplace activity of the potential consumers, e.g., outliers, changepoints, transitions along the purchase cycle. Without limitation, the changepoint detector 181 may be adapted to determine one or more of a breadth, a depth and/or a recency of monitored marketplace activity. As described in more detail hereinbelow, a breadth value may provide an indication whether marketplace activity of a potential consumer activity is broad or narrow. Relatively broad marketplace activity may result from monitored activity observed across multiple different properties, whereas relatively narrow marketplace activity may result from monitored activity observed across a single, or relatively small number of different properties.

A depth value may provide an indication whether marketplace activity would suggest in-depth activity, as in a potential consumer conducting thoughtful analysis or investigation, versus indications that the potential consumer activity was more cursory in nature. Without limitation, a depth value may be determined according to one or more of a temporal duration of the property visit, a measure of data transferred during the property visit, e.g., bytes down, whether the communications were primarily unidirectional, e.g., bytes down, versus an indication that the communications were more interactive, e.g., bytes and/or messages up, ratios of messages up versus messages down, and the like. In at least some embodiments, the depth value may depend upon one or more of the type(s) of message traffic, e.g., text, images, audio, video, interactive, whether the message traffic was primarily of a single type, e.g., primarily text and/or images, versus multimodal message traffic, e.g., text, images, audio, and video.

Recency may refer to a measure of how long ago a user was active within a category under investigation. Recency may be measured with reference to one or more of absolute time, e.g., calendar days, an observation period, e.g., a buyer's average time in market, a sample period, e.g., 24 hours, and the like. In at least some embodiments, recency may be determined in reference to a time at which a buyer browses within a particular phase of the buyer's journey. In at least some embodiments, recency refers to A measure of the time span from the latest round of activity under study, e.g., a mobile URL instance, to the time of segment publication. A larger time span is less valuable than a shorter one. A recency value may be determined responsive to currently monitored activity in view of prior monitored activity. Alternatively or in addition, recency may relate to one or more of a time between successive visits to any marketplace, a time between successive visits to a similar or the same marketplace, and/or a time between successive visits to the same property. One or more than one recency value may be determined and/or otherwise tracked for the category under investigation.

It is understood that not all marketplaces are the same. Likewise, interest in some marketplaces may be greater than in other marketplaces. Accordingly, the techniques disclosed herein including, without limitation, marketplace activity monitoring and/or changepoint detection may be performed for some marketplaces and not for others. Marketplaces, to some degree, may dictate potential consumer behavior. For example, a decision to purchase a meal online may include limited visitations, if any, to relatively few properties and/or be accomplished over a relatively short period, e.g., during a single web browsing session. In contrast, potential consumer activity regarding higher valued items, such home appliances, computers, entertainment equipment, and automobiles, may require more extensive research, analysis and consideration before a consumer progresses to action along the purchase cycle. Consequently, one or more of the marketplace activity monitoring and/or changepoint detection may be limited to a subset of all possible marketplaces. An imposition of marketplace limitations may facilitate processing by reducing the amount of data monitored and/or processed, possibly resulting in quicker and/or more reliable results.

In at least some embodiments, the changepoint detector 181 may have access to historical records of similarly determined values, allowing the changepoint detector 181 to compare values at one time, e.g., current values, with values of another time, e.g., prior values. Historical records may include earlier values with a temporal sequence of values of the same purchase cycle, e.g., during a common time in market of the potential consumer. Alternatively or in addition, the historical records may include values associated with other times at which the same buyer was in the same market, the same buyer was in a different market and/or another buyer was in the same or different market. In at least some embodiments, the changepoint detector 181 evaluates the comparisons to identify any outlier values. For example, the comparison results may be compared to one or more threshold values. When a comparison result exceeds the threshold, the value may be identified as a potential outlier. In at least some embodiments, the comparisons may be determined individually for each of the breadth, depth and/or recency values. Alternatively or in addition, the comparisons may be determined according to more than one of the values, e.g., as a relatively substantial change or departure in one or more of the values to prior values.

In some embodiments, one or more of the marketplace activity monitor 180 and the changepoint detector 181 may be configured beforehand, allowing either or both to operate with little or no interaction. For example, one or more marketplaces are identified, as are monitoring periods, changepoint determination values, e.g., breadth, depth, recency, as well as any thresholds as may be used in evaluation of monitored data and detection of changepoints from the determined values. The changepoint detector 181 may report changepoints as they occur according to such pre-configurations. Alternatively or in addition, the changepoint detector 181 may determine and/or otherwise estimate positions and/or transitions along a purchase cycle for an individual consumer and/or group of consumers according to the pre-configurations. In at least some embodiments, the changepoint detector 181 may be further configured to determine a potential consumer score according to one or more of the breadth, depth and/or recency values, any detected changepoints, and/or any detections of transitions along the purchase cycle and/or estimation of the potential consumer's position along the purchase cycle.

Alternatively or in addition, one or more of the marketplace activity monitor 180 and the changepoint detector 181 may be in communication with one or more user interfaces 182. The user interface 182 may be adapted to present results of marketplace activity monitoring, such as indications of potential consumer activity within one or more marketplaces. The presentation may be presented in a textual format, e.g., tabular data indicating one or more of a date and/or date range, a time and/or a time range, a marketplace indicator, one or more user indicators associated with monitored activity, and so on. Alternatively or in addition, the results may be presented in a graphical format, e.g., according a histogram of marketplace activity, a scatter plot of marketplace activity, a cluster diagram of marketplace activity, a time series presentation of marketplace activity, and so on.

In at least some embodiments, the user interface 182 may be adapted to present one or more calculated values determined according to the monitored marketplace activity, such as breadth, depth and/or recency values. The values may be presented in a textual format, e.g., tabular data indicating one or more of a value, a date and/or date range, a time and/or a time range, a marketplace indicator, one or more user indicators associated with the calculated values, dates and/or times, and so on. Alternatively or in addition, the results may be presented in a graphical format, e.g., according a histogram, a scatter plot, a cluster diagram, a time series view of the calculated values. In at least some embodiments, the user interface 182 may identify changepoints, e.g., along a timeline. The changepoints may be accompanied with an estimate of a position along a purchase cycle. As described in more detail below, an estimate of a position along the purchase cycle may be determined according to one or more of a detected changepoint, variables to which the changepoint was attributed, e.g., an increase in one variable, such as the breadth, coincident with a decrease in another variable, such as a depth, the combination indicative of a user transitioning to the potential consumer entering an awareness building stage of the journey.

It is envisioned that in at least some embodiments, the user interface 182 may display a graphic identifying a location or state of a particular consumer and/or group of consumers along the purchase cycle. Alternatively or in addition, the user interface 182 may provide any calculated scores associated with the potential consumer or group of consumers. In at least some embodiments, the user interface 182 may be adapted to a marketing application, in which a marketeer may analyze data to direct marketing campaigns, such as advertisements that are directed towards a particular stage along the purchase cycle, with a goal of directing the potential consumer to the marketeer's product and/or services and/or otherwise expediting or prompting the potential consumer towards action.

Likewise, in at least some embodiments, the user interface 182 may facilitate marketing campaigns to potential consumers. Marketing campaigns may benefit from accessing via the user interface 192, one or more of identification of potential buyers, distinguishing intenders from enthusiasts, and/or providing a location along the purchase cycle, possibly with a recency value attributed to the potential consumer's activity. In at least some embodiments, marketing activity may include auctions related to sale of advertising space on a user's display, e.g., along a graphical user interface presenting the user's browser, with the impression being presented in an advertising space, such as a banner in the potential consumer's browser as the consumer engages in online activity. It is understood that enhanced value may be attributed to an indication that a potential consumer has been tagged as an intender, possible with additional information relating to the intender's stage in the purchase cycle. A sharing of the buyer status and location along the cycle or journey and/or a score of the buyer as may be determined according to such information, may be utilized in an auction related to digital ads.

In at least some embodiments, the changepoint detector 181 may generate one or more of the breadth, depth and/or recency values according to results obtained from a single monitored period, e.g., a 24-hour period. Alternatively or in addition, the changepoint detector 181 may create and/or otherwise update a historical record of one or more of the breadth, depth and/or recency values based on results obtained from multiple, e.g., successive monitored periods, e.g., successive 24-hour periods.

Figure 2A:
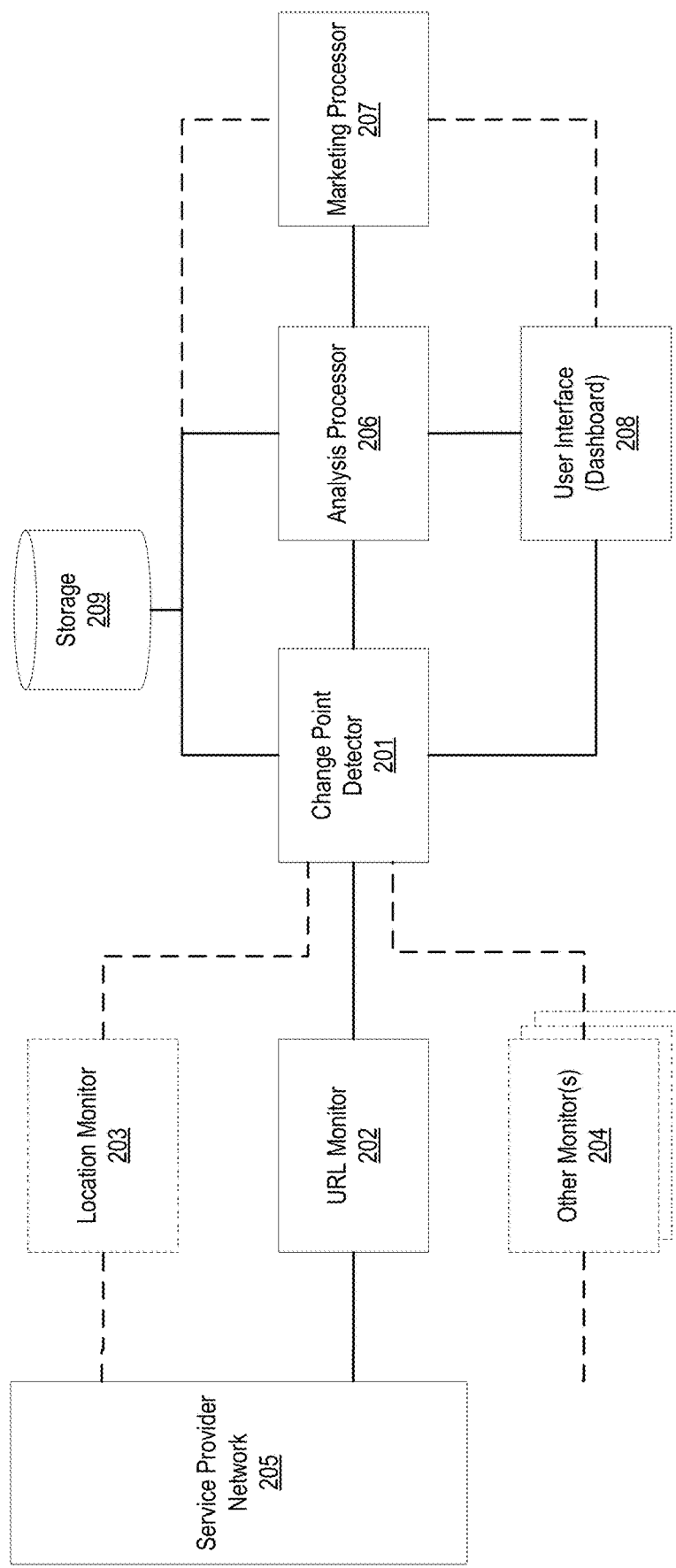
FIG. 2A is a block diagram illustrating an example, non-limiting embodiment of a consumer monitor and evaluation system functioning within the communication network of FIG. 1 in accordance with various aspects described herein.

FIG. 2A is a block diagram illustrating an example, non-limiting embodiment of a consumer monitor and evaluation system 200 functioning within the communication network of FIG. 1 in accordance with various aspects described herein. The system 200 includes a URL monitor 202, a change point detector 201, an analysis and/or scoring processor 206, a storage device 209 and a user interface 208. The URL monitor 202 is in communication with a service provider network 205 and adapted to monitor network activity of subscriber equipment of one or more subscribers of the service provider network 205. According to the illustrative example, the URL monitor 202 monitors URLs, or addresses of content, e.g., files, on a TCP/IP network that may be accessed, viewed and/or otherwise visited by subscriber equipment. Alternatively or in addition, the URL monitor 202 may monitor an IP addresses of a computer or device on the TCP/IP network. The monitoring may be performed on a continuous basis, e.g., identifying a service provider network subscriber and/or subscriber equipment and URLs visited by the subscriber and/or subscriber equipment. The URL monitor 202 may prepare monitoring reports or records that may be provided to the change point detector 201 for analysis and/or detection of changepoints in the monitored subscriber activity.

In at least some embodiments, the URL monitor 202 may monitor one or more other items, such as a date and/or time of a URL visit, a duration of the URL visit, an extent, magnitude, or volume of the visit as may be ascertained by bytes transferred between the subscriber equipment and the URL, an owner of the URL, a category with which the URL may be associated, e.g., a category of a standardized list of web content categories, and so on. In some embodiments, the monitoring records may be updated continuously. Alternatively or in addition, the monitoring records may be updated periodically according to a monitoring period. Monitoring periods may be determined according to a time period, such as a number hours, minutes or seconds, a day, a week, or any other definable time period. In at least some embodiments, the monitored records and/or reports may be stored in the storage device 209.

The analysis processor 206 may be adapted to analyze the monitored information according to one or more of the monitored records and/or reports. By way of example, analyses may determine breadth values, depth values and/or recency values of one or more consumers within one or more different marketplaces. Breadth values may be defined as an average bytes down of a unique URL visit, which measures how broad a browsing event is. Depth values may be defined as weighted average of bytes down of any repeated URL visits, which measures how deep a browsing event is. A browsing event may be defined as a browsing history within a monitoring periods, e.g., browsing within a 24-hour period. It is understood that breadth and depth values may be determined for the same browsing event. In at least some embodiments, a recency value is determined as a number of monitoring periods, e.g., a number of days, since a last browsing event occurred for the same user within the same marketplace. Recency values provide an indication of how active the browsing events may be.

In at least some embodiments the analyses may identify one or more change points in a user's browsing activity over an observation period that may include multiple monitoring periods, e.g., an observation over a lookback period, such as 30 days, 60 days, 90 days or longer. Further analysis according to one or more of the breadth, depth, recency and/or change points may detect and/or otherwise identify changes in stages of a purchase cycle based on more than one of the different values collectively. Alternatively or in addition, the analyses may include determination of a rank, a score, a confidence value and/or other metric as may be beneficial to distinguish one potential consumer from another, a consumer value or rating according to transitions along the purchase cycle, locations within the purchase cycle, confidence levels of any such determinations and/or distinguishing intenders from enthusiasts.

The user interface 208 may facilitate one or more of evaluating monitored records, identifying particular markets of interest, identifying observation windows, identifying potential consumers and/or classes of consumers for further analysis, detecting outliers, presenting analysis results and/or tracking of a position of a potential consumer along the purchase cycle. In at least some embodiments, the system 200 includes one or more of a location monitor 203 and/or other monitors 204. A location monitor 203 may be adapted to determine a location of the subscriber and/or of the subscriber equipment, as may be reported by the subscriber equipment and/or by the service provider network. Other monitors 204 may include, for example, mobility monitors, such as accelerometers to determine movement, environmental monitors, such as thermometers, cameras and/or microphones, biometric monitors, such as thermometers, pulse rate, body temperature. For example, cameras and/or image recognition systems may be adapted to identify presence of a potential consumer at a location of the camera according to image analysis. Likewise, an identification card reader and/or credit card reader may identify presence of the potential consumer at the location of the reader. Such location information reader from the other monitors 203, 204 may be provided to the change point detector 201 and/or the analysis/scoring processor 206 to facilitate determination of one or more of the breadth, depth, and recency values and/or to facilitate detection of change points and/or identification of a stage along the purchase cycle.

It is envisioned that, in at least some embodiments, the system 200 may include a marketing processor 207 in communication with one or more of the change point detector 201, the analysis/scoring processor 206, the storage device 209 and/or the user interface. The marketing processor 207 may be adapted to utilize monitored records or reports and/or any analysis results, e.g., including change point detection and/or a determination of a stage of a potential consumer along the purchase cycle, and/or any scores that may have been determined therefrom. The marketing processor 207 may further facilitate direction of a marketing campaign, e.g., serving advertisements of a general nature for potential consumers in an awareness and/or consideration stage, while also serving advertisements of a more in depth and/or focused nature for potential consumers in a later stage of the purchase cycle.

Figure 2B:
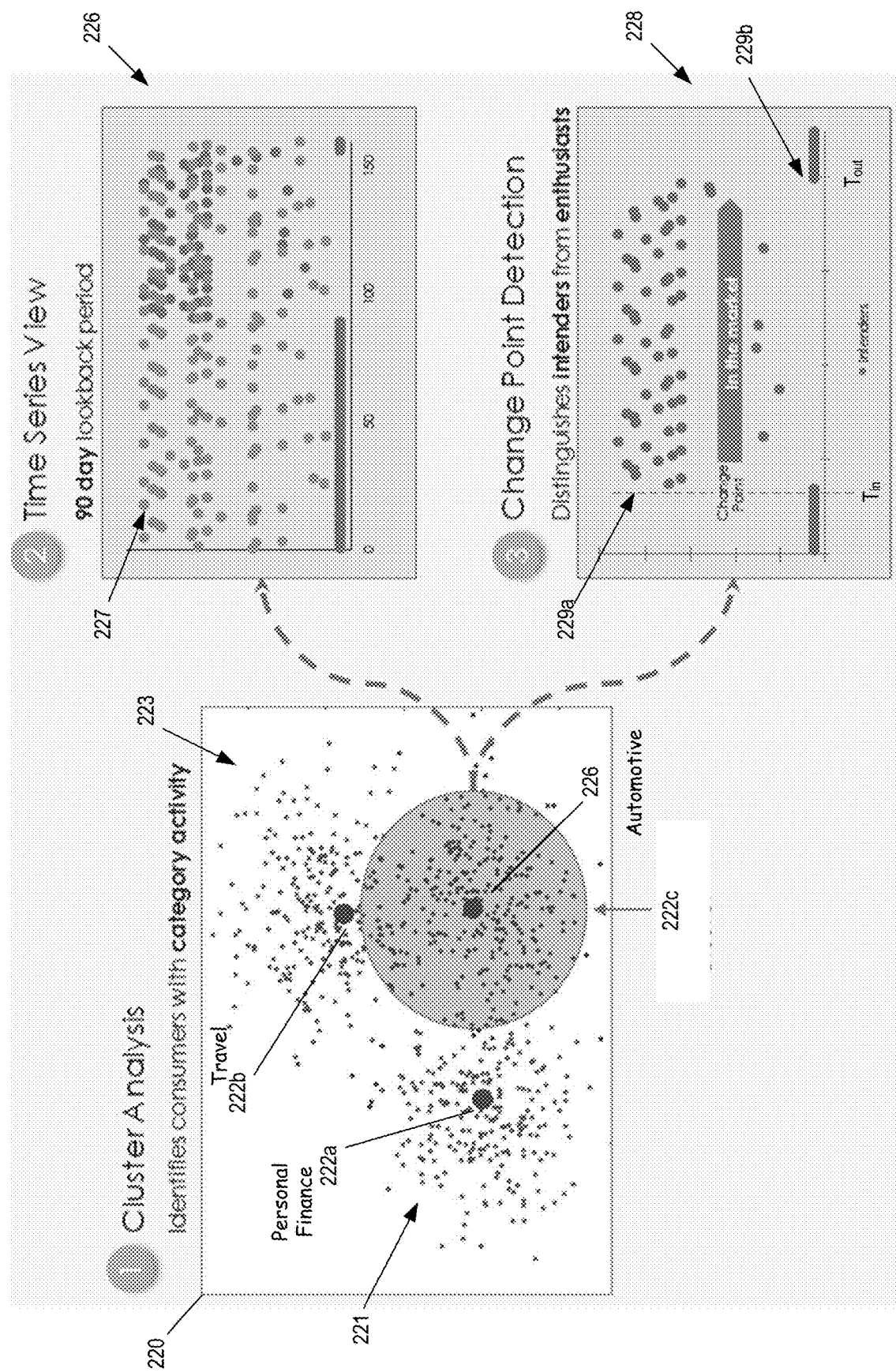
FIG. 2B is a graphical representation of online consumer activity processed by the communication network of FIG. 1 and the consumer monitor and evaluation system of FIG. 2A, in accordance with various aspects described herein.

FIG. 2B is a graphical representation of online consumer activity obtained by the communication network 100 of FIG. 1 and the consumer monitor and evaluation system 200 of FIG. 2A, in accordance with various aspects described herein. A first frame depicts one example of a cluster analysis, in which monitored marketplace activity for a group of online users is evaluated as potential consumers. In particular, a scatter plot 220 is provided representing audience members and their corresponding visited properties, e.g., according to URLs, subject categories, brands, owners, and the like. The scatter plot 229 is arranged according to a clustering algorithm, e.g., in this instance, to facilitate audience segmentation. According to the illustrative example, web search data date may be obtained for a group of users, e.g., as pairs of addresses and/or URLs visited and corresponding user identities. The network addresses and/or URLs may be categorized according to a group of marketplaces, such as the IAB categories, allowing the cluster analysis to plot visited URLs, and/or their corresponding categories versus users. According to the example cluster analysis 220, at least some of the users may visit URLs in more than one category. Likewise, each URL or category may be visited by more than one user.

Similarly, more than one marketplace categories in which user activity occurred are plotted for the corresponding group of potential consumers. The cluster analysis may be applied in marketing scenario, e.g., to identify homogeneous groups of buyers. In the illustrative example, property indicators, e.g., URLs, for web sites, are plotted for a relatively large number of consumers. Each of the plotted points of the scatter plot represents a visited URL or marketing category and a corresponding user identifier. The results may be evaluated as one or more clusters, in this example, three separate clusters. The different clusters represent user activity in different marketplaces. For example, a first cluster 221 of the plotted points has a first centroid 222a related to a first marketplace, e.g., personal finance. Likewise, a second cluster 223 of the plotted points has a second centroid 222b, e.g., travel, and a third cluster 225 of plotted points has a third centroid 222c, e.g., automotive. Thus, the audience of monitored users has been segmented according to three market categories: personal finance, travel, and automotive. Division of an audience into segments in this manner may be beneficial for further analysis, e.g., in that audiences in same segments are more similar to each other than to those in other segments. The URLs may be obtained by monitoring mobile user activity. For example, records of visited URLs for a group of mobile subscribes are obtained daily and plotted in the scatter plot over an observation period. The observation period may be a predetermined period, e.g., 30 days, 90 days, 180 days, or any other number as might be suitable given a predetermined average time in the market.

A second frame depicts a time-series view 226 depicting online activity for one of the example marketplace categories under investigation, e.g., the automotive category. A time-series change point detection may be applied to the time series view 226 to differentiate between new intenders, enthusiasts, and existing intenders of a particular marketplace. Audience members of potential consumers who started browsing automotive web content recently may characterized as new automotive intenders. For example, a potential consumer may not have visited any URLs within the automotive category within a 90-day look-back period, as determined by zero URL visitations of the first time series view 226 between day 0 and day 90. At day 90, however, URL visitations of the potential consumer include URLs within the automotive category. Accordingly, the potential consumer becomes an intender at day 0, according to URL activity within the automotive marketplace and a lack of activity during the preceding, 90-day look-back period.

Audience members with persistent URL visitations within the automotive marketplace for more than a predetermined period of time may be characterized as enthusiasts. For example, if an automotive intender, having been characterized as an intender on day 0, visits URLs in the automotive marketplace on day 91, i.e., the day after the look-back period, then the intender may be re-labeled as an enthusiast. In at least some embodiments, once a potential consumer has been labeled as an enthusiast, they may remain as an enthusiast for another predetermined period of time, e.g., 30 days, regardless of an activity or lack thereof within the automotive marketplace.

The time-series view 226 illustrates different URLs visited within the automotive marketplace for the group of potential consumers during different days over an observation period. The example observation period is 180 days, extending from a reference day zero to day 180. The plotted time sample data points 227 of the automotive category may be distinguished according to one or more particular potential consumers. The sample points are color coded, showing a darker group of points representing visited URLs of a particular user, while a lighter group of points represents visited URLs of other members of the group of potential consumers. According to the illustrated example, the particular potential consumer shows that no URLs were visited with the automotive category from day zero through day 90. However at day 90, the particular user began to visit URLs within the automotive category periodically throughout day 180.

A third frame depicts a change point analysis of the particular potential consumer to distinguish intenders from enthusiasts. The plotted time sample data points 228 of the automotive marketplace for the particular potential consumer are shown, e.g., removing URLs searched by other potential consumers. A first changepoint 229a may be detected at time $T_{in}$, when the particular potential consumer began visiting URLs within the automotive marketplace. A second changepoint 229b may be detected at time $T_{out}$, when the particular potential consumer no longer visited URLs within the automotive marketplace. A time period between $T_{duration} = T_{out} - T_{in}$ represents a duration of time in which the particular potential consumer was active in the automotive market. The in which monitored marketplace activity for a group of online users is evaluated as potential consumers. In at least some embodiments, the total time in the market may be compared to a threshold value to distinguish an intender from an enthusiast.

It is understood that an intender is someone who may be intending to make a near term or imminent purchase. Marketplace activity for intenders is characterized to an expressed interest in a particular marketplace as determined from property visitations, e.g., URLs visited that are associated with the particular marketplace. Typically, the potential consumer will engage in a purchase cycle, once having expressed interest as an intender, with the purchase cycle potentially result in action, e.g., a purchase. It is expected that the potential consumer's site visitations will terminate at some point, e.g., coincident with a decision to leave the particular marketplace, or after a purchase has been made within the marketplace. Consequently, a predetermined time period may be identified to compare to a potential consumer's total time in the marketplace. Should the particular user exhibit a consistent behavior in the marketplace, e.g., a consistent browsing behavior, during the predetermined period, the potential consumer may be labeled and/or otherwise characterized as an enthusiast. According to the illustrative example, the threshold time in the market for the automotive marketplace is set at 90 days. It is understood that different marketplaces may have different threshold durations to make such distinctions between intenders and enthusiasts.

By way of example, an intender segments methodology may employ a learning model, such as an unsupervised learning model based on an anomaly detection model that identifies key changes in behavior observed in monitored mobile device URL visitations. A look-back window may be employed to facilitate identification of intenders. For example, an automotive intender segment may use a 90-day look back period to distinguish whether or not a consumer has been active in a category before (over a relevant range of 90 days). If the consumer has not been active previously but, is active in day 91, then a consumer may be flagged as an intender. Such an algorithm to identify intenders may be referred to as a first example of change point detection.

Likewise, an enthusiast segments methodology may also employ an unsupervised learning model based on an anomaly detection model that identifies key changes in behavior seen in observed monitored mobile device URL visitations. Once again, an intender segment lookback window using a 90 look back period to distinguish whether or not a consumer has been active in a category before (over a relevant range of 90 days). If the consumer has been active previously and, is active on a day immediately following the relevant range, e.g., on day 91, then a consumer may be flagged as an enthusiast. It is understood that the consumer need not be active every day in the lookback window but must show activity on day 91 to be included as an enthusiast. Such an algorithm to distinguish enthusiasts from intenders may be referred to as a second example of change point detection.

An interest segments methodology may employ a traits-based model based on activity seen in tier 1 and/or tier 2 of the mobile service provider browsing categories. An interest segment lookback window may be set at any value, e.g., at 24 hours, or 30 days. In at least some embodiments, no particular algorithm or scoring is applied beyond clustering based on frequency of occurrence.

Still other potential consumer segments may include viewership-based segments determined according to a methodology that employs traits-based model based on minutes of viewing over a 30-day time period. A viewership-based segment lookback window may be set at 30 days. In at least some embodiments, no particular algorithm or scoring is applied beyond clustering based on frequency of occurrence.

According to an example scoring methodology, five data points are applied to create a time-based scoring and estimation of a consumer's conversion propensity. A first group of the data points may include recency, frequency, and intensity. Recency may include a measure of a time span from the latest round of activity under study, e.g., mobile URL instances, to a time of segment publication. A longer time span is generally less valuable than a shorter one. Frequency may include a measure of a number of times an activity, e.g., mobile URL instances, is witnessed within a time period. Intensity may include a measure of a volume of each visitation event measured in session minutes/seconds and/or bytes up and/or bytes down. A second group of date points may include a breadth and a depth. The breadth may include a measure of the number of unique URLs visited within a 24-hour period alone, or in concert with an intensity measure for that URL. Depth may include a measure of a number of repeat visits to a particular URL within a 24-hour period alone or in concert with an intensity measure for that URL.

Figure 2C:
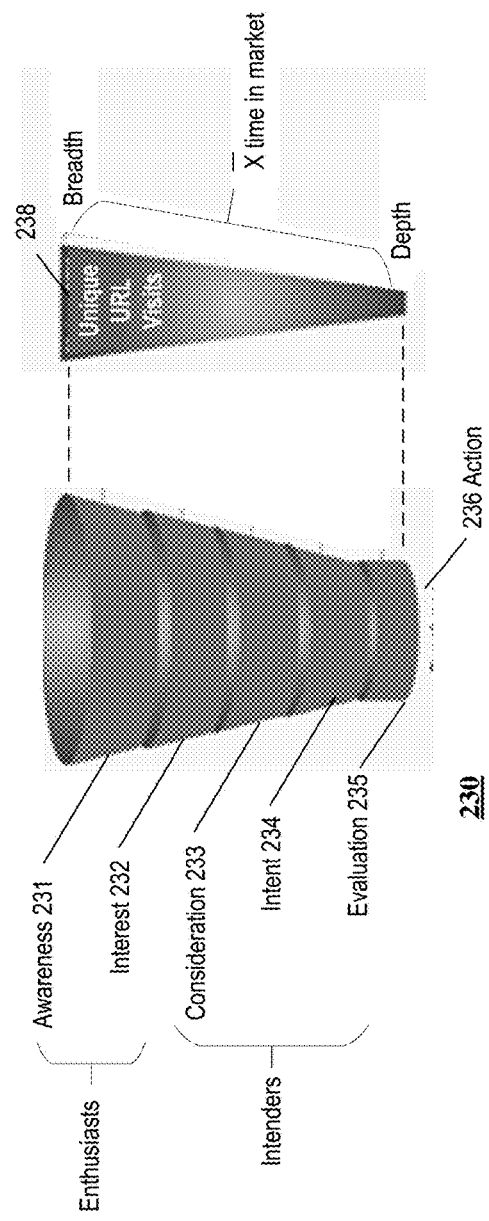
FIG. 2C is a schematic diagram illustrating an example, non-limiting embodiment of stages of a purchase cycle as may be determined by the communication network of FIG. 1 and the consumer monitor and evaluation system of FIG. 2A, in accordance with various aspects described herein.

FIG. 2C is a schematic diagram illustrating an example, non-limiting embodiment of progressive stages of a purchase cycle as may be determined by the communication network 100 of FIG. 1 and the consumer monitor and evaluation system 200 of FIG. 2A, in accordance with various aspects described herein. By analogy, the purchase cycle is represented as a purchase funnel 230. The funnel has a relatively large top end identified as an awareness stage 231. The awareness stage 231 may represent a potential consumer's entry into an online process that may ultimately lead to some action 236. In the context of activity within a marketplace, the action 236 may correspond to an ultimate purchase. The so-called purchase cycle corresponds to the potential consumer's activity between the awareness stage 231 and any ultimate action 236, e.g., purchase.

As suggested by the purchase funnel, the purchase cycle may transition through one or more intermediate phases or states. The potential consumer's time in the particular marketplace represented by the purchase funnel 230 also generally progresses from an entry point 238 in which the user visits a relatively large number of unique URLs, to an exit point at which the user visits a relatively small number of unique URLs, but to a greater depth. According to the illustrative example, a progression along the purchase funnel 230 from awareness towards action 236 may progress to an interest stage 232, then, possibly to a consideration stage 233, followed by an intent stage 234 and an evaluation stage 235.

Although distinct stages are shown, the number and/or granularity of the purchase cycle may depend upon the particular marketplace. Namely, some high investment purchases, such as automotive or personal finance, may require a more thoughtful progression towards any ultimate purchase. Enthusiasts generally participate in marketplace activity in one or more of the awareness 231 and interest 232 stages, e.g., keeping abreast of new products and services in a generally ongoing fashion. An intender may also spend some time in awareness 231 and/or interest 232 stages, but ultimately progresses further along the purchase funnel 230, e.g., to one or more of the consideration 233, intent 234 and/or evaluation stages 235. Enthusiast may be distinguished from intenders by their lack of progressing to any of the consideration 233, intent 234, evaluation 235 or action 236 stages and/or by persistent activity with the purchase funnel, and primarily within the awareness 231 and/or interest 232 stages. Persistence may be determined according to a predetermined lookback period, as may be dependent upon the particular marketplace. According to the illustrative example of the auto marketplace, a lookback period may be established at about 90 days.

It is understood that in at least some situations, a potential consumer may skip one or more intervening stages along the purchase cycle, e.g., progressing from awareness 231 to consideration 234 or evaluation 235, without necessarily experiencing interest 232 or intent 234, per se. Thus, the purchase cycle may progress from awareness 231 to consideration 233, e.g., with interest 232 being inferred or otherwise collapsed with awareness 231 or consideration 233. Likewise, the purchase cycle may progress from consideration 233 to evaluation 235, e.g., with intent 234 being inferred or otherwise collapsed with consideration 233 or evaluation 235. It is further understood that progression along the purchase cycle may not occur in one direction only. For example, a potential customer may progress to an evaluation stage 235 only to revert to an awareness 231 or consideration stage 233. Consider a situation in which the evaluation stage 235 proved unsatisfactory and the potential consumer reverts to identifying other alternatives within the same marketplace.

According to the techniques disclosed herein, each of any number of distinguishable stages along a purchase cycle, such as the illustrative example stages, may be characterized by one or more of the breadth, depth and/or recency values. For example, awareness 231 may be characterized by a relatively high breadth value and a relatively low depth value, indicating that the potential consumer is building an awareness within a particular marketplace. Interest 232 may be identified by relatively high breadth value, a relatively low depth value and a recency value indicating that the potential consumer has returned to the marketplace based on an interest.

Figure 2D:
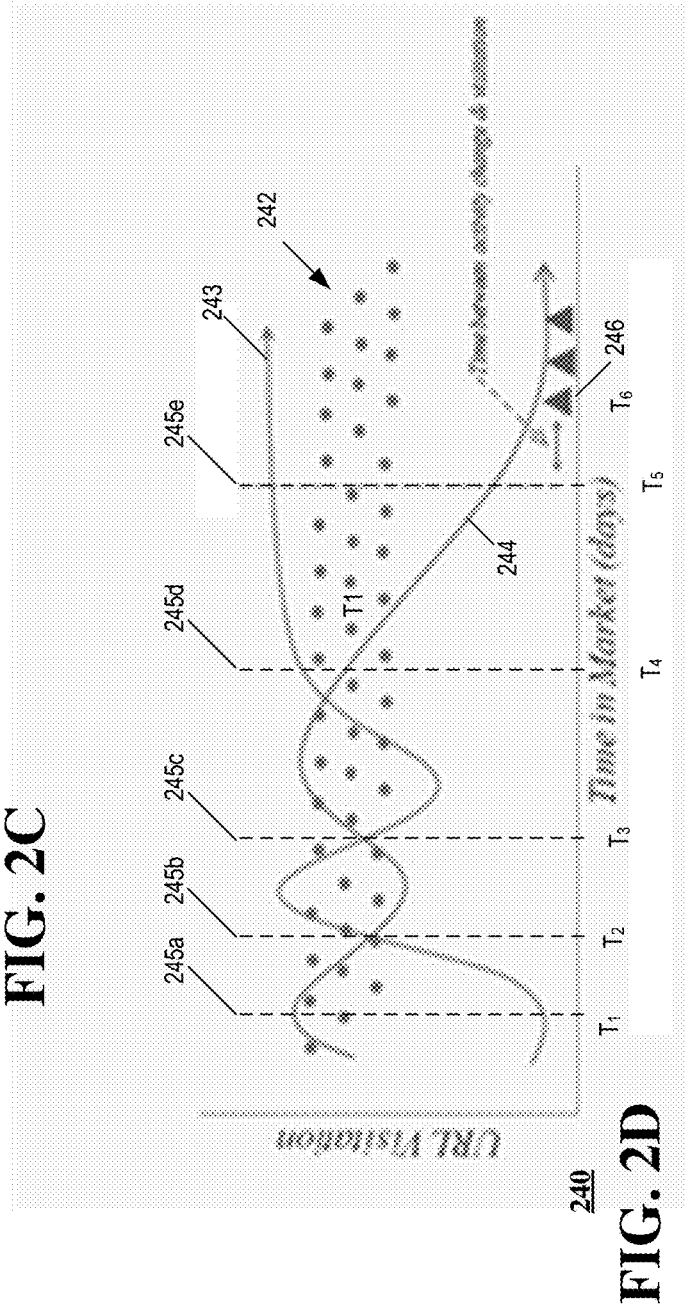
FIG. 2D is a graph illustrating an example, non-limiting embodiment of change point detection as may be determined by the communication network of FIG. 1 and the consumer monitor and evaluation system of FIG. 2A, in accordance with various aspects described herein.

FIG. 2D is a graph illustrating an example, non-limiting embodiment of change point detection as may be determined by the communication network of FIG. 1 and the consumer monitor and evaluation system of FIG. 2A, in accordance with various aspects described herein. In particular the graph illustrates URL visitations versus time in market for a particular marketplace. URL activity for a potential consumer in the marketplace may be represented by points 242. The URL activity may be evaluated to determine a number and/or a proportion of URLs visited within each sample period that are unique. A first curve 244 represents a volume and/or proportion of unique URLs across the time in market. The example unique URL curve 44 is relatively high upon initial entry into the market, rising slightly, followed by a first reduction, then by a second rise before trailing off towards the most recent or end of the potential consumer's time in market.

Similarly the URL activity may be evaluated to determine a browsing volume or depth, e.g., according to one or more of a browsing duration, average and/or max time spent at URLs, bytes up and/or bytes down. A second curve represents the browsing volume or depth 243 across the time in market. The example unique browsing volume or depth curve 243 is relatively low upon initial entry into the market, rising dramatically to a first peak, followed by a first reduction, then by a second rise towards the most recent or end of the potential consumer's time in market. According to the illustrative example, the first and second curves move in opposite directions, such that when one is relatively low, the other is relatively high. This is not expected to be true for every instance of time in market for any particular potential consumer.

According to the illustrative example, the potential consumer's browsing activity within the example marketplace indicates that the potential consumer may be in intender, or possibly an enthusiast depending upon total time in market. Beginning from the left-most portion of the graph 240, a relatively high number of unique URLs coincident with a relatively low browsing volume indicates that the potential consumer may be characterized as being in an awareness stage 231 of the purchase cycle. At a first time $T_1$, at which point the number of unique URLs decreases, while the browsing volume remains relatively low, indicates that the potential consumer may be characterized as being in an interest stage 232 of the purchase cycle. Accordingly, a first change point 245a may be determined as occurring at $T_1$, at which point the potential consumer transitions from an awareness stage 231 to an interest stage 232. At a second time $T_2$, at which the number of unique URLs continue to decrease, while the browsing volume undergoes a dramatic increase, indicates that the potential consumer may be characterized as being in a consideration stage 233 of the purchase cycle. Accordingly, a second change point 245b may be determined as occurring at $T_2$, at which point the potential consumer transitions from an interest stage 232 to a consideration stage 233.

At a third time $T_3$, at which the number of unique URLs once again increases, while the browsing volume undergoes a relative reduction, while the number of unique URLs and browsing volume remain relatively high, indicates that the potential consumer may be characterized as being in an intent stage 234 of the purchase cycle. Accordingly, a third change point 245c may be determined as occurring at $T_3$, at which point the potential consumer transitions from a consideration stage 233 to an intent stage 234.

At a fourth time $T_4$, at which the number of unique URLs decreases dramatically, e.g., below a first threshold value, while the browsing volume remains high, indicates that the potential consumer may be characterized as being in an evaluation stage 234 of the purchase cycle. Accordingly, a fourth change point 245d may be determined as occurring at $T_4$, at which point the potential consumer transitions from an intent stage 234 to an evaluation stage 235.

At a fifth time $T_5$, at which the number of unique URLs decreases further, e.g., below a second threshold value, while the browsing volume remains high, indicates that the potential consumer may be characterized as being in an evaluation stage 234 of the purchase cycle. Accordingly, a fifth change point 245e may be determined as occurring at $T_5$, at which point the potential consumer transitions from an intent stage 234 to an evaluation stage 235. In at least some embodiments, the URL visitation data may be supplemented by other data that may facilitate characterization of a position and/or transition along the purchase cycle. According to the illustrative example, visitations 246 occur, beginning at time $T_6$. Visitations may be determined according to a location of the potential consumer's mobile device coinciding with a predetermined location of a physical property of the marketplace under analysis. Such visitations may suggest that the potential consumer is transitioning to an action stage 236, e.g., in which case the potential consumer may be visiting showrooms, physically evaluating a product or service of the marketplace, and the like.

Figure 2E:
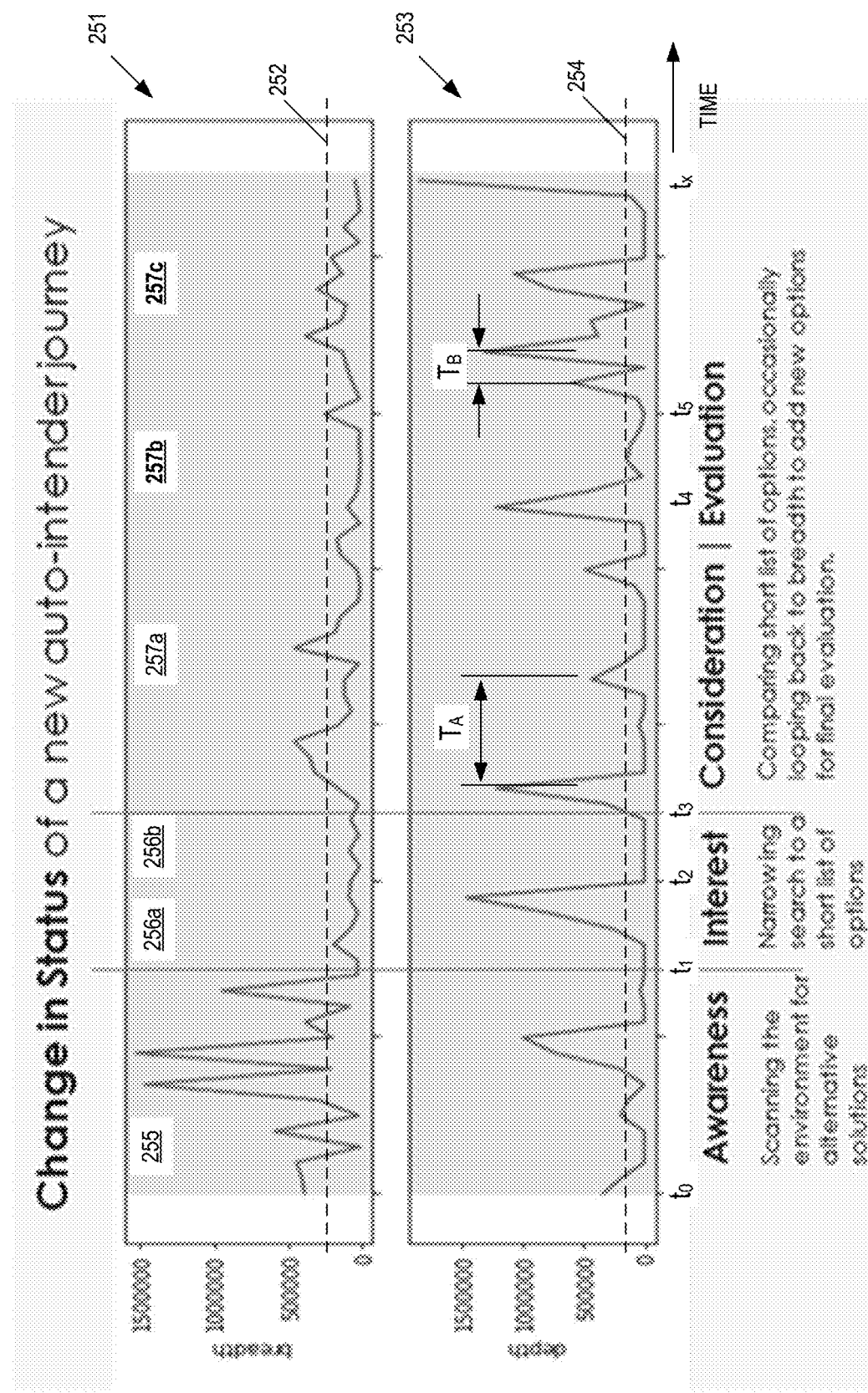
FIG. 2E is a graph illustrating another example, non-limiting embodiment of change point detection as may be determined by the communication network of FIG. 1 and the consumer monitor and evaluation system of FIG. 2A, in accordance with various aspects described herein.

FIG. 2E is a graph illustrating another example, non-limiting embodiment of change point detection as may be determined by the communication network of FIG. 1 and the consumer monitor and evaluation system of FIG. 2A, in accordance with various aspects described herein. A first graph 251 provides a measure of a breadth of potential consumer activity within a particular marketplace versus time. In at least some embodiments, and without limitation, breadth may be determined according to a number and/or a ration of unique properties visited. Once again, properties may include, without limitation, URLs. A second graph 253 provides a measure of a depth of potential consumer activity within a particular marketplace versus time. In at least some embodiments, and without limitation, depth may be determined according to an extent, or volume of the potential consumers interaction with the visited properties. Once again, depth may include, without limitation, a volume of bytes up and/or bytes down associated with one or more of the visited properties.

According to the illustrative example, the first and second graphs are aligned according to their temporal axes to permit a multivariate analysis in which a joint consideration of both breadth and depth may be examined and/or otherwise evaluated to identify one or more of outliers, changepoints, transitions and/or positions along the purchase cycle. During an initial period 255 between $t_0$ and $t_1$, it is observed that the breadth is relatively high, while the depth is relatively low. It may be determined from this combination that the potential consumer may be characterized as being within an awareness stage of the purchase cycle. According to the awareness stage, the potential buyer may be scanning an environment of the marketplace for alternative solutions.

During a first subsequent period 256a between $t_1$ and $t_2$, the depth increases, while the breadth markedly decreases. During a following period 256b between $t_2$ and $t_3$, both the breadth and depth values are low. It may be determined by one or more of the relatively low breadth and intermittent depth that the potential consumer may be characterized as being within an interest stage of the purchase cycle. According to the interest stage, the potential buyer may be narrowing their search to a short list of options.

During another following period 257a between $t_3$ and $t_4$, the breadth remains relatively low, while coincidently, the depth undergoes periods of relatively high activity. It may be determined by one or more of the relatively low breadth and relatively high depth that the potential consumer may be characterized as being within a consideration stage of the purchase cycle. According to the consideration stage, the potential buyer may be comparing a short list of options, occasionally looping back to breadth to add new options for final evaluation.

During yet another following period 257b between $t_4$ and $t_5$, the breadth remains relatively low, while coincidently, the depth is also relatively low. It may be determined by one or more of the relatively low breadth and relatively low depth that the potential consumer may be characterized as being within an evaluation stage of the purchase cycle. According to the illustrative example, the potential consumer's depth increases, while the breadth remains low, suggesting further consideration as may be associated with the evaluation stage, or signal a reversion to the consideration stage. During period 257c, the breadth remains relatively low, while the depth increases, possibly indicating that the potential consumer has returned to a consideration phase.

In at least some embodiments, an estimation of a particular stage may be determined not only by values of breadth, depth and/or recency, but also by determinations of one or more preceding stages. Here the evaluation stage having low breadth and depth occurs after having estimated the potential consumer as being in an interest and/or consideration phase. According to the evaluation stage, the potential consumer may be undergoing a final evaluation according to a culmination of their marketplace activity before taking any action.

According to the illustrative example, the first graph 251 includes a first breadth threshold 252 to which observed and/or otherwise calculated breadth values may be compared. Comparisons to the threshold may determine whether a breadth value is relatively high or relatively low, e.g., for purposes of determination of outliers, change points, transitions and/or stages of the purchase cycle. Likewise, the second graph 235 includes a first depth threshold 254 to which observed and/or otherwise calculated depth values may be compared. Comparisons to the threshold 254 may determine whether a depth value is relatively high or relatively low, e.g., for purposes of determination of outliers, change points, transitions and/or stages of the purchase cycle. It is envisioned that more than one threshold may be used within either or both of the first and second graphs 251, 253, e.g., to provide a finer granularity of the marketplace activity.

In at least some embodiments, one or more of the thresholds 252, 254 may depend upon the current and/or prior estimated stage in the purchase cycle. For example, a relatively high breadth threshold may be applied during a potential consumer's entry into the particular marketplace, whereas a lower breadth threshold may be applied after it has been determined that a potential consumer has expressed an awareness and/or interest within the marketplace.

Alternatively or in addition, one or more of any such thresholds 252, 254 may depend to at least some degree on characteristics of an individual potential consumer and/or upon a class to which a potential consumer may be member. In this regards, an initial step may include identifying the potential consumer's identity and/or demographics, psychographics, and the like. Characterization of the potential consumer may depend upon one or more of a personal profile, evaluations of prior online activity, prior evaluations of transitions and/or positions along a purchase cycle within the same marketplace, or within another marketplace. Such additional insights may account for idiosyncrasies of an individual and/or class of individuals.

In at least some embodiments, determinations of one or more of the breadth, depth and/or recency values and/or identifications of outliers, changepoints, transitions and/or positions along a purchase cycle may be updated and/or otherwise refined as updated monitored results are obtained and/or analyzed. It is worth noting that recency values may be determined from one or more of monitored periods of activity. Consider a user may perform online research during free periods, such as weekends, and/or during opportunities at other times of the week, such as during evenings. An evaluation of recency may depend at least partially upon the nature of the particular marketplace, e.g., whether it is business related or personal. Business related marketplace activity may occur during business days and/or hours, while personal activities may occur outside of business hours. Accordingly, marketplace inactivity for a personal product or service during the weekdays may not signify a departure from marketplace activity.

FIG. 2F is a graph 260 illustrating another example, non-limiting embodiment of change point detection as may be determined by the communication network of FIG. 1 and the consumer monitor and evaluation system of FIG. 2A, in accordance with various aspects described herein. The graph 260 includes a breadth portion 262 illustrating breadth values, a depth portion 264 illustrating depth values, and a recency portion 266 illustrating recency values. The example values 262, 264, 266 are obtained from a browsing history of a particular mobile device over an example 80-day period. In particular, the browsing history within a particular category or marketplace of interest, such as the automotive marketplace.

An application of the example changepoint detection algorithm, disclosed herein, to the example values 262, 264, 266 detected four change points 263a, 263b, 263c, 263d, generally 263. The resulting change points 263 separate the values 262, 264, 266 into five stages, i.e., stages I, II, III, IV and V. According to the illustrative example, both the breadth and depth values are relatively low within stage I, which occurs between day 0 and an occurrence of the first changepoint 263a, while the recency value is at a stable frequent state. At least one interpretation of this particular configuration of breadth, depth and recency values indicates the mobile device owner is at a beginning stage of shopping within the automobile marketplace.

Moving to stage II, extending between the first and second changepoints 263a, 263b, the breadth value increases, while the depth and recency values remain about the same, indicating the mobile device owner is engaging in active research of different auto brands, but has yet to form a set of candidates for purchase, sometimes referred to as a consideration set. Stage III, extending between the second and third changepoints 263b, 263c, may be referred to as an "idle" stage, since both breadth and depth values return back to relatively low values, while the recency values also remain relatively low.

It is understood that in at least some scenarios, depending upon the mobile device owner's behavior, there may be some interruptions to the purchase process. For example, due to a change of shopping plans, or perhaps some other interruption that has distracted the device owner or otherwise demanded her attention. Moving to stage IV, which extends between the third and fourth changepoints 263c, 263d, the browsing behavior starts to show up again. The activity within this stage includes a relatively high breadth value and a relatively low depth value, with activity that is fairly spread-out as indicated by the increased portions of the recency values. This may indicate that the mobile device owner has returned back to the automotive market and started a new round of research. According to stage V, occurring after the fourth changepoint 263d, there is an abrupt increase in the depth value, with low breadth value and substantially no browsing events found after that. It may be inferred that the mobile device owner has formed a consideration set and left the market for this example 80-day cycle.

Figure 2G:
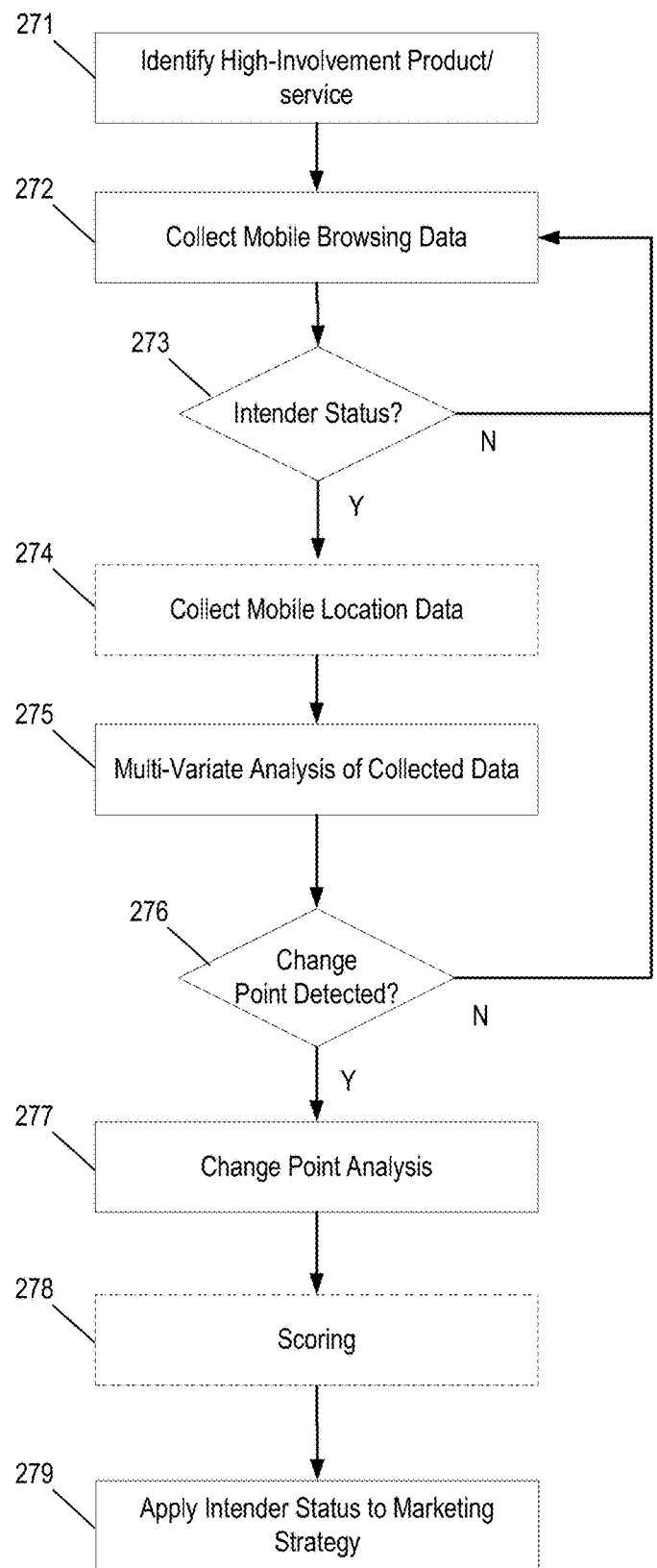
FIG. 2G depicts an illustrative embodiment of a process adapted to determine stages of consumer's journey in accordance with various aspects described herein.

FIG. 2G depicts an illustrative embodiment of a process 270 adapted to determine stages of consumer's journey in accordance with various aspects described herein. According to the process 270, a high-involvement product/service is identified at 271. Mobile browsing data is collected at 272. The mobile browsing data is collected in association with a mobile user identifier. The identifier may be tokenized and/or otherwise modified for the purposes of data collection and/or evaluation disclosed herein, to preserve the mobile user's identity. Any such token value may be used by one or more actors, such as the mobile service provider, to identify the subscriber identity as may be useful and/or appropriate to direct a marketing campaign and/or advertising material and/or to facilitate any auctions as may be used in association with directing marketing and/or advertising material, e.g., impressions.

A determination is made at 273 as to whether the mobile user is an intender. To the extent the user is not an intender, the process 270 returns to collecting mobile data at 272 and evaluating intender status at 273. To the extent the user is determined at 273 to be an intender, a multivariate analysis of the collected mobile browsing data is performed at 275.

In at least some embodiments, the process 270 collects mobile location data at 274 (shown in phantom). Mobile location data may include geolocation coordinates as determined and/or otherwise reported by one or more of the mobile device or a mobile service provider. To the extent mobile location data is collected, it may be applied to the multivariate analysis at 275, such that the multivariate analysis is based on collected mobile browsing data and collected mobile device location data.

A determination is made at 276 as to whether a change point was detected according to the multivariate analysis performed at 274. To the extent it was determined at 276 that a changepoint was not detected, the process 270 returns to collecting mobile browsing data at 272, determining intender status at 273, and so on. However, to the extent it was determined at 276 that a change point was detected, a change point analysis may be performed at 277. The change point analysis may include an outlyingness function $O(x,F)$ adapted to measures for each point x its "outlyingness" in a distribution F on $\mathbb{R}^d$), in which $\mathbb{R}^d$ represents real coordinate space of dimension d, with higher values for greater "outlyingness." Without relying on an assumption of any specific parametric family, it provides the global view of each point with respect to the distribution.

The terms $m(X)$ and $S(X)$ represent sample location and scatter measurements. For given location and scatter measures, a corresponding Mahalanobis distance outlyingness function may be defined as:

$$O_{MD}(x, F) = \frac{\tilde{O}_{MD}(x, F)}{1 + \tilde{O}_{MD}(x, F)}, x \in R^d$$

Where: $\tilde{O}_{MD}(x,F) = \|\Sigma(F)^{-1/2}(x-\mu(F))\|$, $x \in R^d$ and $\|\cdot\|$ the Euclidean norm. Sample versions $O_{MD}(x, F)$ and $\tilde{O}_{MD}(x, F)$ are similarly defined.

Depending on the choices of sample location and scatter measures $m(X_n)$ and $S(X_n)$, the sensitivity of the sample Mahalanobis distance outlyingness to the change point in the sequential data may also different. By way of example mean and covariance matrixes may be used for $\mu(X_n)$ and $\Sigma(X_n)$, respectively, due to the fact that they are both very sensitive to anomalies.

In at least some embodiments, the process 270 includes mobile user scoring at 278 (shown in phantom). One or more of the intender status, the change point analysis results, and/or any scoring may be used to facilitate marketing to the mobile user. For example, a marketing strategy may be created, implemented and/or otherwise modified at 279.

By way of further example, a change point detection algorithm may include a series of steps performed upon a sequence of data $\{x_1, x_2, \ldots, x_t, x_{t+1}\}$. The $x_n$ data elements may include multidimensional vectors, e.g., having components selected from two or more of the breadth, depth, and recency. Intuitively, if the current point $x_t$ is a change point, then the difference between its outlyingness and the outlyingness value of $x_{t-1}$ should be relatively large and so does the current and previous outlyingness values of $x_{t-1}$. Based on this, the algorithm may be formed by an initializing system in which an initial depth value is assigned to $x_1$ and an analysis set member analysis_set$_1 = x_1$. In a subsequent step, new data $x_t$ is observed at a later time. The analysis set is formed in this manner, such that analysis_set$_t$ = analysis_set$_{t-1}$ ∪ [$x_t$]. To the extent missing data is encountered, previous feature values may be copied to current, e.g., adding random normal noise.

Next, a Mahalanobis distance outlyingness is calculated and a depth value updated accordingly. Table 1 provided below outlines the steps of an example of a change-point detection algorithm:

TABLE 1

Changepoint Detection Algorithm.

Step 1 Initialize: Assign an initial depth value to $x_1$ and set analysis_set$_1$ = $x_1$
Step 2 Observe new data: $x_t$
Step 3 Form analysis set:
    analysis_set$_t$ = analysis_set$_{t-1}$ ∪ [$x_t$]
Step 4 Handling missing data:
    Copy previous feature values to current and add random normal noise
Step 5 Calculate Mahalanobis distance Outlyingness and Update depth:
    if t = 2 then depth$_t$ = Normalized Euclidean Distance($x_1, x_2$)
    otherwise calculate
        $MD_{t-1}$ = Mahalanobis Distance Outlyiness($x_{t-1}$)
        $MD_t$ = Mahalanobis Distance Outlyiness($x_t$)
        if |depth$_{t-1}$ - $MD_{t-1}$| > threshold1 and |$MD_t$ - $MD_{t-1}$| > threshold2
        then
            depth$_t$ = initial value and $x_t$ is a change point
            analysis_set$_t$ = [$x_t$]
        else
            depth$_t$ = $MD_t$ and $x_t$ is NOT a change point
Step 6 Repeat Step 2 - 5

By way of example, the algorithm of Table 1 was applied to sample data and able to detect 4 change points in a monitored sample of 80 days browsing data obtained from a mobile subscriber device based on three features (breadth, depth, and recency) collectively. Those change points have separated the data into 5 stages. According to stage I, Awareness, both breadth and depth are low, and recency is at a stable frequent state. This indicates the device owner is at a beginning stage of shopping for automobiles. Moving to stage II, Interest, the breadth increases, while the depth and recency remain about the same, indicating the device owner is in active research of different auto brands, yet has not formed a set of candidates for purchase, e.g., a consideration set. Stage III is an "idle" stage since both breadth and depth return back to low values. There might be some interruptions to the purchase process, for example, change of shopping plans, etc. Moving to stage IV, browsing behavior starts to show up with high breadth and low depth and are fairly spread-out. This combination of values indicates the subscriber has returned back to the marketplace and started a new round of research. In a last stage of the example, there is an abrupt increase in the depth, coincident with low breadth, and no browsing events found after that. The subscriber might have formed a consideration set and left the market for this example 80-day cycle.

Figure 2H:
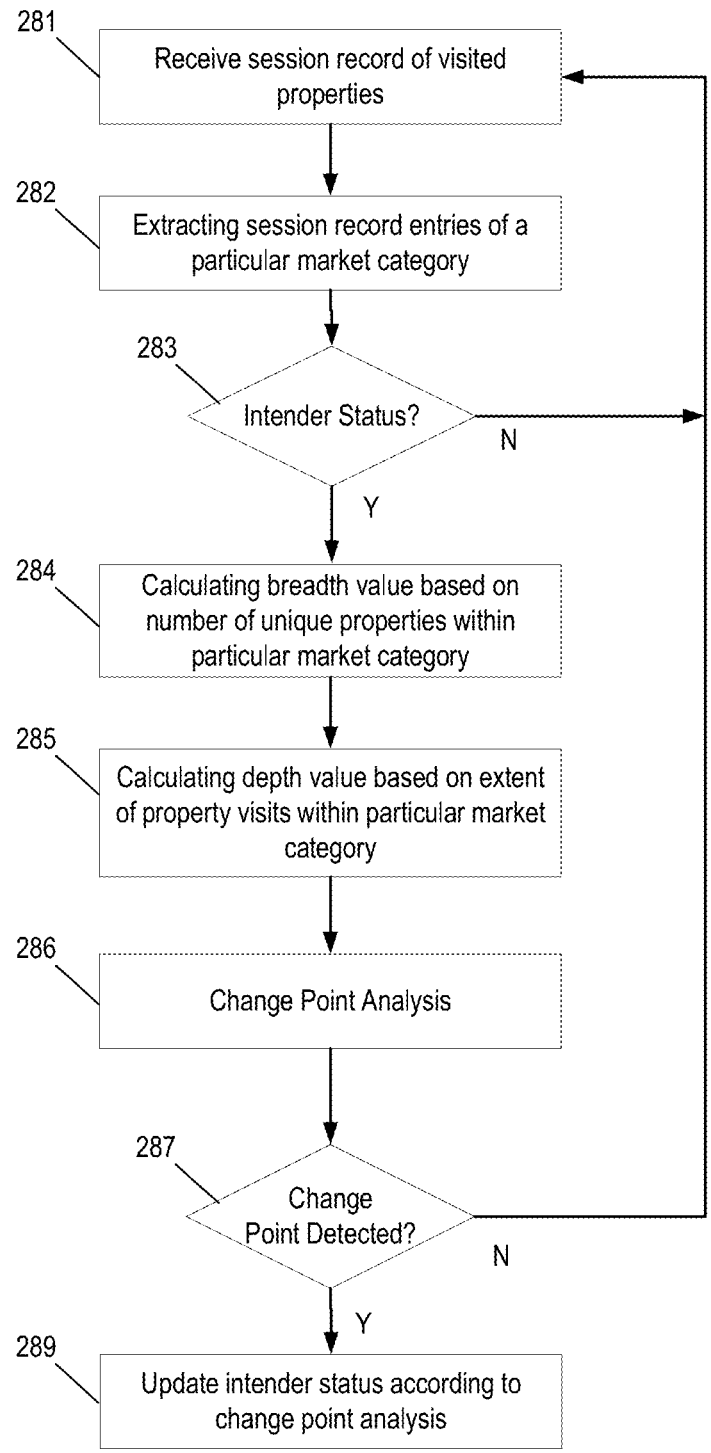
FIG. 2H depicts another illustrative embodiment of a process adapted to determine stages of consumer's journey in accordance with various aspects described herein.

FIG. 2H depicts another illustrative embodiment of a process 280 adapted to determine stages of consumer's journey in accordance with various aspects described herein. According to the process 280, a session record of properties visited during a sample period, or session, is received at 282. The properties may include network accessible resources, such as network connected devices, internet of things devices and/or web content. Network accessible resources may be identified by network addresses, device identifiers, and/or URLs, such that the receives session record may include such network addresses, identifiers and/or URLs. Alternatively or in addition, the properties may include physical resources, in which instances, the receives session record may include geocoordinates, a physical address and/or an owner or use attributed to the visited property, e.g., a Ford® dealership.

The received session record may include records of a single consumer or multiple consumers. In either instance, identities of individual consumers may be tokenized and/or otherwise modified for the purposes of data collection and/or evaluation disclosed herein, to preserve the mobile user's identity. Any such token value may be used by one or more actors, such as the mobile service provider, to identify the subscriber identity as may be useful and/or appropriate to direct a marketing campaign and/or advertising material and/or to facilitate any auctions as may be used in association with directing marketing and/or advertising material, e.g., impressions.

Visitation records of the received session record that are associated with a particular market category are extracted at 282 and/or otherwise distinguished, e.g., marked, to allow processing of the extracted and/or distinguished records. Continuing with the illustrative example of an automobile intender, any visitation records of one or more consumers that pertain to the automotive marketplace are extracted and/or marked. It is understood that the received session record may include multiple different marketplaces and possibly records that are not associated with any particular marketplace.

A determination is made at 283 as to whether the consumer(s) may be characterized according to an intender status. To the extent the consumer(s) are not an intender, the process 280 returns to receiving session records of visited properties at 281, extraction session records of the particular market category at 282 and evaluating intender status at 283. To the extent the user is determined at 283 that the consumer(s) are intenders, a breadth value is calculated at 284. The breadth value is based on a number of unique properties visited within the particular market category. The breadth value may be determined according to any of the various techniques disclosed herein. The process 280 also calculates a depth value at 285. The depth value is based on an extent of property visits within the particular market category. The depth value may be determined according to any of the various techniques disclosed herein. For example, the depth value might include a duration of time spent at a particular property and/or an extent of data transferred between the particular property and equipment of the consumer(s). Data transfer may include a number of bytes downloaded from a property during a particular visit and/or a number of bytes downloaded from the same property during a sample period, e.g., a 24-hour period. The depth values may be determined for individual properties, and/or for a collective group of properties, such as those properties associated with a particular sub-market category, e.g., trucks, and/or a particular brand, e.g., the Ford Motor Co.

According to the process 280, a change point analysis is performed at 286. The change point analysis is based on one or more of the breadth and depth values and indicates a departure of sorts of the consumer(s)' behavior. In at least some examples, the breadth and/or depth values of a particular visitation session, e.g., a 24-hour period, are compared with one or more historical records for the same consumer(s) within the same market category. The change point analysis may employ any of the various techniques disclosed herein alone or in combination, such a multivariate analysis and/or identification of an outlier, e.g., according to determination of a Mahalanobis distance between a point and a distribution.

A determination is made at 287 as to whether a change point was detected according to the multivariate analysis performed at 286. To the extent it was determined at 287 that a changepoint was not detected, the process 280 returns to receiving an updated session record of visited properties at 281, extracting updated session record entries of the particular market category at 282, and so on. However, to the extent it was determined at 287 a status of the intender is updated at 289 according to the change point analysis. For example, the change point may indicate a transition along a purchase cycle, e.g., from an awareness building stage, to an evaluation stage, from an evaluation stage to an action stage, and so on.

While for purposes of simplicity of explanation, the respective processes are shown and described as a series of blocks in FIGS. 2G and 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and processes 270 and 280 presented in FIGS. 1, 2A, 2G, 2H, and 3. For example, the virtualized communication network 300 may facilitate in whole or in part determining breadth and depth values of marketplace activity of a consumer within a select group of properties, e.g., URLs visited during a sample period, and determining a change point suggesting a state transition along the consumer's purchase cycle within the particular category based on comparisons between the breadth and depth values of the sample period and historical records of prior breadth and depth values determined for the same consumer.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

According to the illustrative example, the system 300 includes an online activity monitor 380 adapted to monitor web browsing attributable to network traffic handled by the virtualized network function cloud 325. The system 300 further includes a changepoint detector/scoring system 381 adapted to analyze monitored web browsing activity, to obtain multiple different values characterizing the web activity and to detect changepoints in a potential consumer's progression along a purchase cycle for a particular marketplace according to the monitored web browsing activity. Equipment of one or more of the broadband access 110, the wireless access 120, and/or the VNE 334 may include a user interface 382a, 382b, 382c, generally 382. In at least some embodiments, the user interface 382 may be provided in an application or app. The app may communicate with backend services of one or more of the online activity monitor 380 and/or the changepoint detector/scoring system 381.

Figure 4:
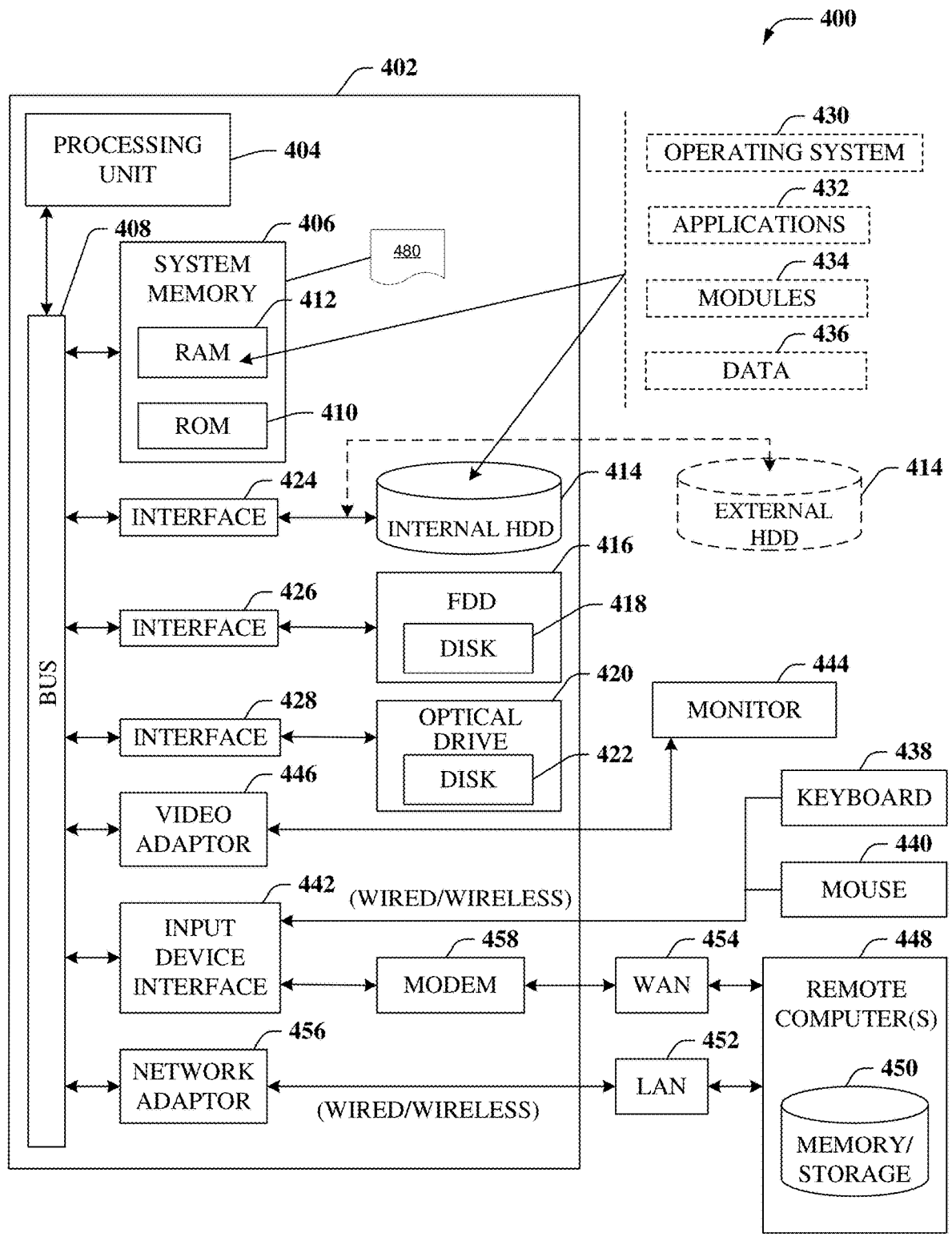
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 may facilitate in whole or in part determining breadth and depth values of marketplace activity of a consumer within a select group of properties, e.g., URLs visited during a sample period, and determining a change point suggesting a state transition along the consumer's purchase cycle within the particular category based on comparisons between the breadth and depth values of the sample period and historical records of prior breadth and depth values determined for the same consumer.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In at least some embodiments, the computing environment 400 stores executable machine-readable instructions adapted to perform functionality of one or more of the online activity monitor 202, 380 and/or the changepoint detector/scoring system 201, 381, and/or the analysis scoring processor 206 and/or the marketing processor 207, and/or the user interface 208, 382 (FIGS. 2A and 3).

Figure 5:
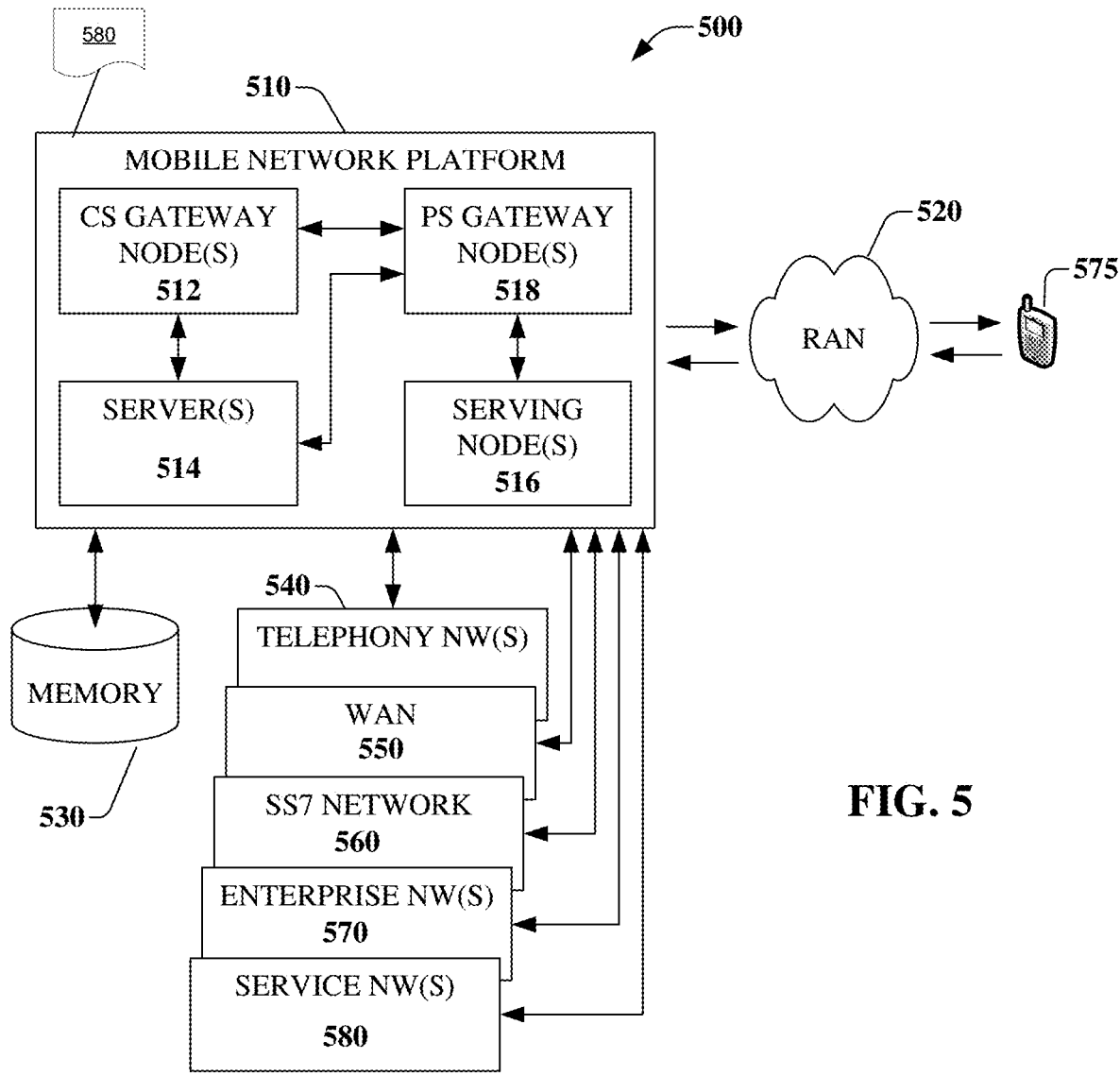
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 may facilitate in whole or in part determining breadth and depth values of marketplace activity of a consumer within a select group of properties, e.g., URLs visited during a sample period, and determining a change point suggesting a state transition along the consumer's purchase cycle within the particular category based on comparisons between the breadth and depth values of the sample period and historical records of prior breadth and depth values determined for the same consumer. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

In at least some embodiments, the mobile network platform 510 is adapted to include functionality 580 adapted to one or more of the online activity monitor 202, 380 and/or the changepoint detector/scoring system 201, 381, and/or the analysis scoring processor 206 and/or the marketing processor 207, and/or the user interface 208, 382 (FIGS. 2A and 3).

Figure 6:
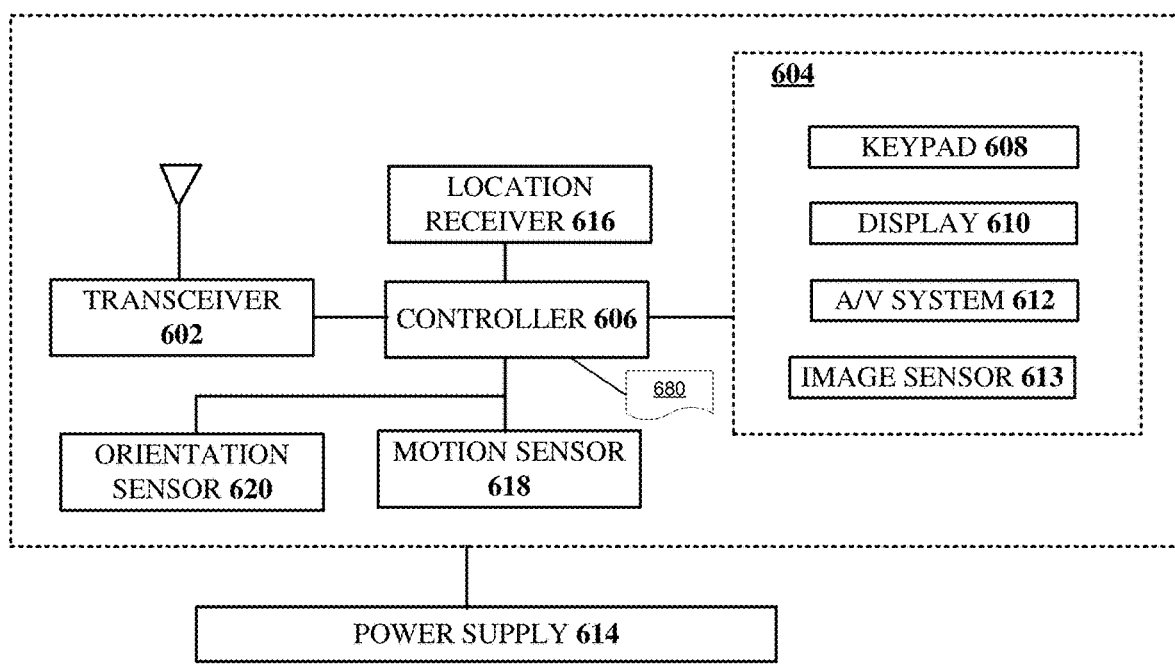
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 may facilitate in whole or in part determining breadth and depth values of marketplace activity of a consumer within a select group of properties, e.g., URLs visited during a sample period, and determining a change point suggesting a state transition along the consumer's purchase cycle within the particular category based on comparisons between the breadth and depth values of the sample period and historical records of prior breadth and depth values determined for the same consumer.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In at least some embodiments, the communication device 600 is adapted to include functionality 680 adapted to one or more of the online activity monitor 202, 380 and/or the changepoint detector/scoring system 201, 381, and/or the analysis scoring processor 206 and/or the marketing processor 207, and/or the user interface 208, 382 (FIGS. 2A and 3).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method for determining a state transition associated with communications with websites with web addresses, comprising:
    receiving session record data from a memory device, wherein the session record data indicates access to the web sites, and the session record data compares a plurality of web addresses of the websites accessed from a client device over a network during a predetermined period;
    determining based on the plurality of web addresses in the session record data and a taxonomy of market categories associated with the plurality of web addresses of the web sites in market places, a category associated with the session record data;
    extracting based on the category associated with the session record data, a select group of web addresses of the plurality of web addresses of the websites accessed from the client device over the network during the predetermined period;
    calculating a breadth value of the select group of web addresses accessed from the client device over the network during the predetermined period, wherein the breadth value is based on a number of unique web addresses of the select group of web addresses of the websites accessed from the client device over the network during the predetermined period;
    calculating a depth value of the select group of web addresses accessed from the client device over the network during the predetermined period, wherein the depth value is based on an extent of user interaction with content of web addresses of the select group of web addresses;
    training a machine learning model to predict state transitions of accessing websites based on variations in a distribution of the breadth value and a distribution of the depth value without relying on a specific parametric family;
    identifying, by the trained machine learning model, a change point of the client device accessing the select group of web addresses from a first state to a second state in a purchase cycle prior to a purchase;
    retrieving, responsive to the identifying the change point, content data of the second state, wherein the content data includes a directed content for advancing toward a subsequent state in the purchase cycle; and
    transmitting the content data of the second state to the client device over the network to cause display of the content data of the second state by an application in the client device thereby limiting access from the client device to a part of the website according to the second state.

2. The method of claim 1, wherein the taxonomy of marketplaces comprises a hierarchal taxonomy of marketplaces, comprising a first-tier marketplace and a second-tier sub-marketplace of the first-tier marketplace.

3. The method of claim 2, wherein the hierarchal taxonomy of marketplaces comprises an industry standard list of categories and sub-categories of the Interactive Advertising Bureau (IAB).

4. The method of claim 1, wherein the plurality of web addresses comprises uniform resource locators (URLs).

5. The method of claim 1, wherein the depth value comprises bytes of information transferred between the select group of web addresses and equipment of the user.

6. The method of claim 1, wherein the identifying of the change point further comprises:
    applying, by the processor an outlyingness function to the breadth value of the select group of web addresses visited within during the predetermined period, to obtain a measure of breadth value outlyingness of the predetermined period in reference to a prior breadth value distribution comprising a prior breadth value of a prior predetermined period;
    applying, by the processor an outlyingness function to the depth value of the select group of web addresses visited within the category during the predetermined period, to obtain a measure of depth value outlyingness of the predetermined period in reference to a prior depth value distribution comprising a prior depth value of the prior predetermined period; and
    determining, by the processor the change point in the purchase cycle based on the measure of breadth value outlyingness and the measure of depth value outlyingness.

7. The method of claim 6, wherein the outlyingness function comprises a Mahalanobis Distance outlyingness function.

8. The method of claim 1, further comprising:
    calculating, by the processor a recency value according to a time between the predetermined period including the select group of web addresses and an immediately prior predetermined period including a web address visited within the category.

9. The method of claim 8, wherein the identifying of the change point in the purchase cycle of the user is further based on the recency value.

10. The method of claim 9, further comprising calculating, by the processing system, a score indicative of an advertising value of the user based upon the change point.

11. The method of claim 1, further comprising:
obtaining, by the processor a historical session record comprising the plurality of web addresses within the category visited by the user during a look-back period; and
classifying, by the processor the user as an intender responsive to the historical session record lacking any web addresses visited within the category.

12. The method of claim 11, wherein the look-back period is determined according to the category.

13. A device for determining a state transition associated with a communication with properties with web addresses, comprising:
a processing system including a processor; and
a memory that stores executable instructions that, when executed by the processing system, facilitate performance of operations, the operations comprising:
receiving, by the processor, session record data for monitoring access to the properties from a memory device, wherein the session record data comprises a plurality of web addresses of properties accessed from a client device over a network during a predetermined period;
determining based on the plurality of web addresses in the session record data and a taxonomy of market categories associated with the plurality of web addresses of the properties in marketplaces, a category associated with the session record data;
obtaining based on the category associated with the session record data, a select group of properties of the plurality of web addresses of the properties accessed from the client device over the network during the predetermined period;
calculating a breadth value of the select group of properties accessed from the client device over the network during the predetermined period, wherein the breadth value is based on a number of unique web addresses of the select group of properties accessed from the client device over the network during the predetermined period;
calculating a depth value of the select group of properties accessed from the client device over the network during the predetermined period, wherein the depth value is based on an extent of user interaction with content of the properties of the select group of properties;
training a machine learning model to predict state transitions of accessing websites based on variations in a distribution of the breadth value and a distribution of the depth value without relying on a specific parametric family;
identifying based on the trained machine learning model, a change point of the client device accessing the select group of web addresses from a first state to a second state in a purchase cycle prior to a purchase;
retrieving, responsive to the identifying the change point, content data associated with the second state, wherein the content data includes a directed content for advancing toward a subsequent state in the purchase cycle; and
transmitting the content data of the second state to the client device over the network to cause display of the content data of the second state in the client device thereby limiting access from the client device to a part of the website according to the second state.

14. The device of claim 13, wherein the taxonomy of marketplaces comprises a hierarchal taxonomy of marketplaces, comprising a first-tier marketplace and a second-tier sub-marketplace of the first-tier marketplace.

15. The device of claim 13, wherein the select group of properties comprise network addresses visited by equipment of the user via a telecommunications network, and wherein the obtaining of the select group of properties is based upon an association of the network addresses and a category of the taxonomy of marketplaces.

16. The device of claim 13, wherein the identifying of the change point further comprises:
applying, by the processor, an outlyingness function to the breadth value of the select group of properties of the predetermined period, to obtain a measure of breadth value outlyingness of the predetermined period in reference to a prior breadth value distribution comprising a prior breadth value of a prior predetermined period;
applying, by the processor, an outlyingness function to the depth value of the select group of properties of the predetermined period, to obtain a measure of depth value outlyingness of the predetermined period in reference to a prior depth value distribution comprising a prior depth value of the prior predetermined period; and
determining, by the processor, the change point in the purchase cycle based on the measure of breadth value outlyingness and the measure of depth value outlyingness.

17. The device of claim 13, further comprising:
calculating, by the processor, a recency value according to a time between the predetermined period including web addresses visited within the category and an immediately prior predetermined period including a web address visited within the category.

18. A machine-readable non-transitory storage medium, comprising executable instructions that, when executed by a processor cause a computer system to execute a method comprising:
receiving session record data from a memory device, wherein the session record data indicates access to properties, and the session record data comprises a plurality of web addresses of properties accessed from a client device over a network during a predetermined period;
determining based on the plurality of web addresses in the session record data and a taxonomy of market categories associated with the plurality of web addresses of the properties in market places, a category associated with the session record data;
extracting based on the category associated with the session record data, a select group of properties of the plurality of web addresses of the properties accessed from the client device over the network during the predetermined period;
determining a breadth value of the select group of properties accessed from the client device over the network during the predetermined period, wherein the breath value is based on a number of unique web addresses of the select group of properties accessed from the client device over the network during the predetermined period;

determining a depth value of the select group of properties accessed from the client device over the network during the predetermined period, wherein the depth value is based on an extent of user interaction with content of the properties of the select group of properties;

training a machine learning model to predict state transitions of accessing websites based on variations in a distribution of the breadth value and a distribution of the depth value without relying on a specific parametric family;

identifying, by the trained machine learning model, a change point of the client device accessing the select group of web addresses from a first state to a second state in a purchase cycle prior to a purchase;

retrieving, responsive to the identifying the change point, content data of the second state, wherein the content data includes a directed content for advancing toward a subsequent state in the purchase cycle; and transmitting the content data of the second state to the client device over the network, to cause display of the content data of the second state by an application in the client device thereby limiting access from the client device to a part of the website according to the second state.

19. The machine-readable storage medium of claim 18, wherein the select group of properties comprise network addresses visited by equipment of the user via a telecommunications network, wherein the extracting of the select group of properties is based upon an association of the network addresses and the category of the predetermined taxonomy of marketplaces, and wherein the depth value comprises bytes of information transferred between a network address of the select group of properties and equipment of the user, in association with the category during the predetermined period.

20. The machine-readable storage medium of claim 18, wherein the identifying of the change point further comprises:

applying, by the processor, an outlyingness function to the breadth value of the select group of properties of the predetermined period, to obtain a measure of breadth value outlyingness of the predetermined period in reference to a prior breadth value distribution comprising a prior breadth value of a prior predetermined period;

applying, by the processor, an outlyingness function to the depth value of the select group of properties of the predetermined period, to obtain a measure of depth value outlyingness of the predetermined period in reference to a prior depth value distribution comprising a prior depth value of the prior predetermined period; and determining, by the processor, the change point in the purchase cycle based on the measure of breadth value outlyingness and the measure of depth value outlyingness.

* * * * *